J. M. JOHNSON.
COIN AND TICKET FARE BOX AND REGISTER.
APPLICATION FILED NOV. 16, 1914.
1,344,898.
Patented June 29, 1920.
11 SHEETS—SHEET 5.
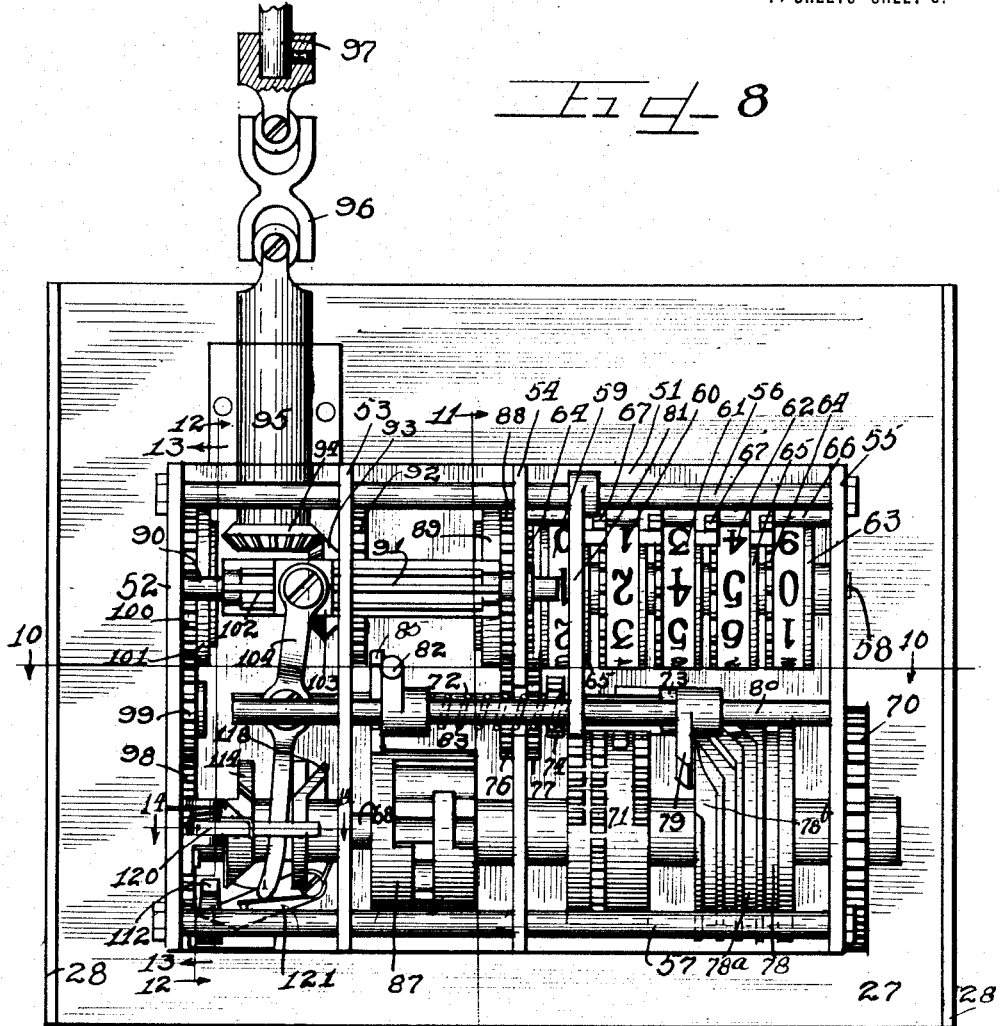
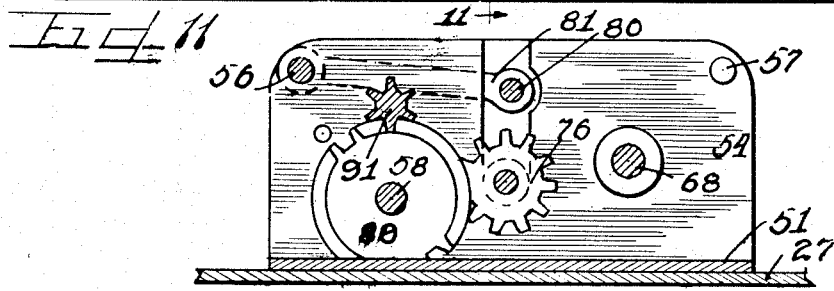
Witnesses
J. W. Angell
Charles W. Hill Jr.
Inventor
Jay M. Johnson
by Charles W. Nice Atty.

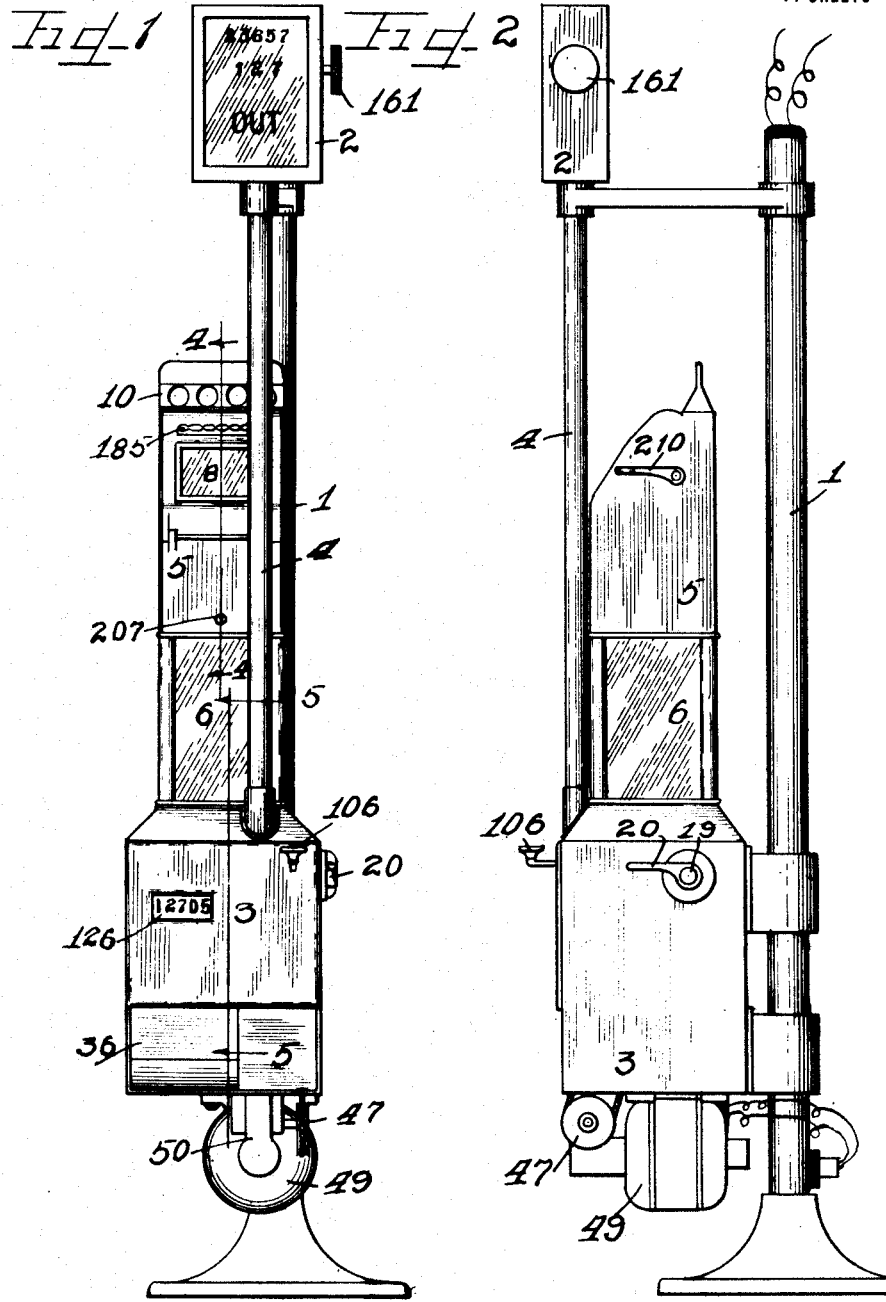

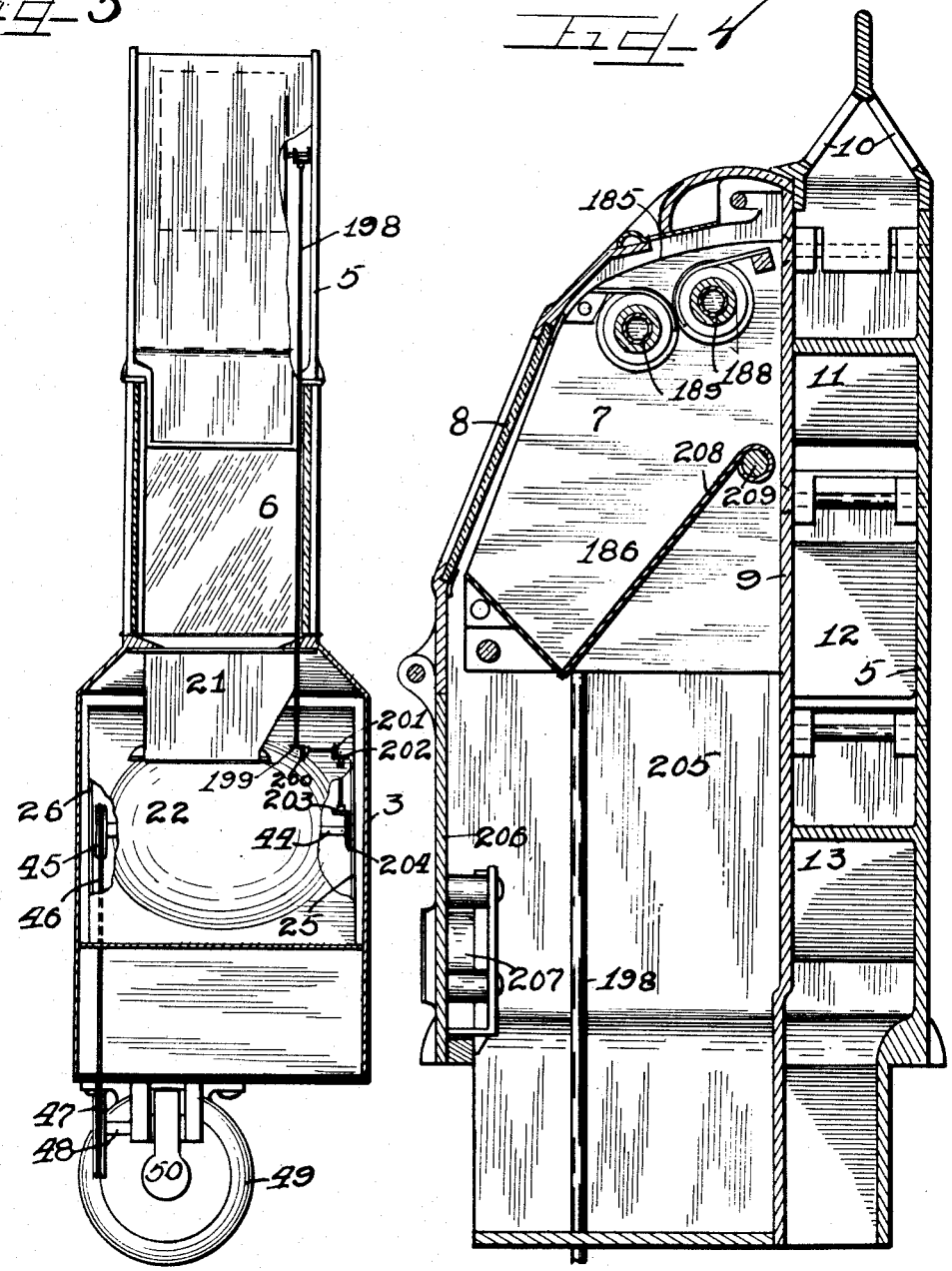

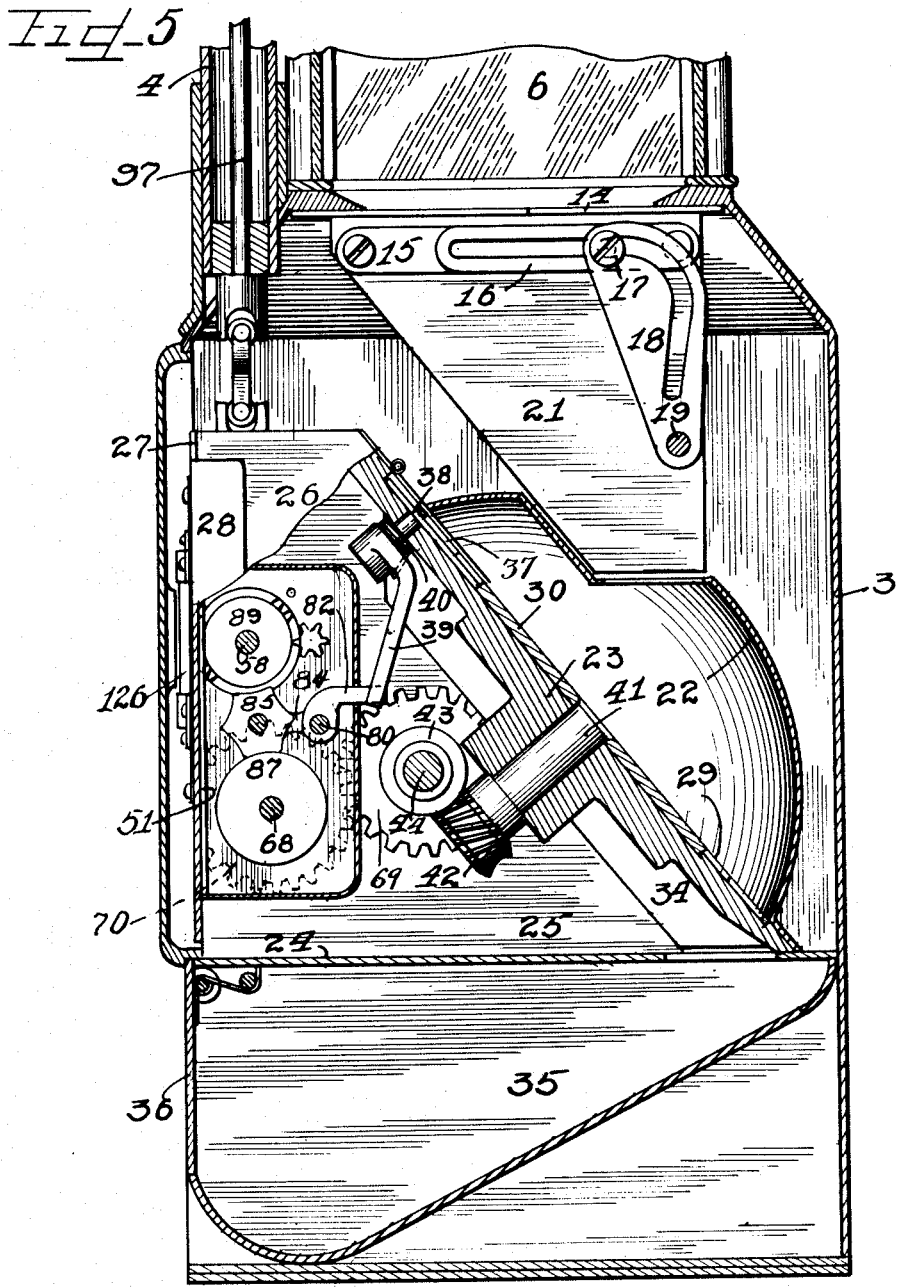

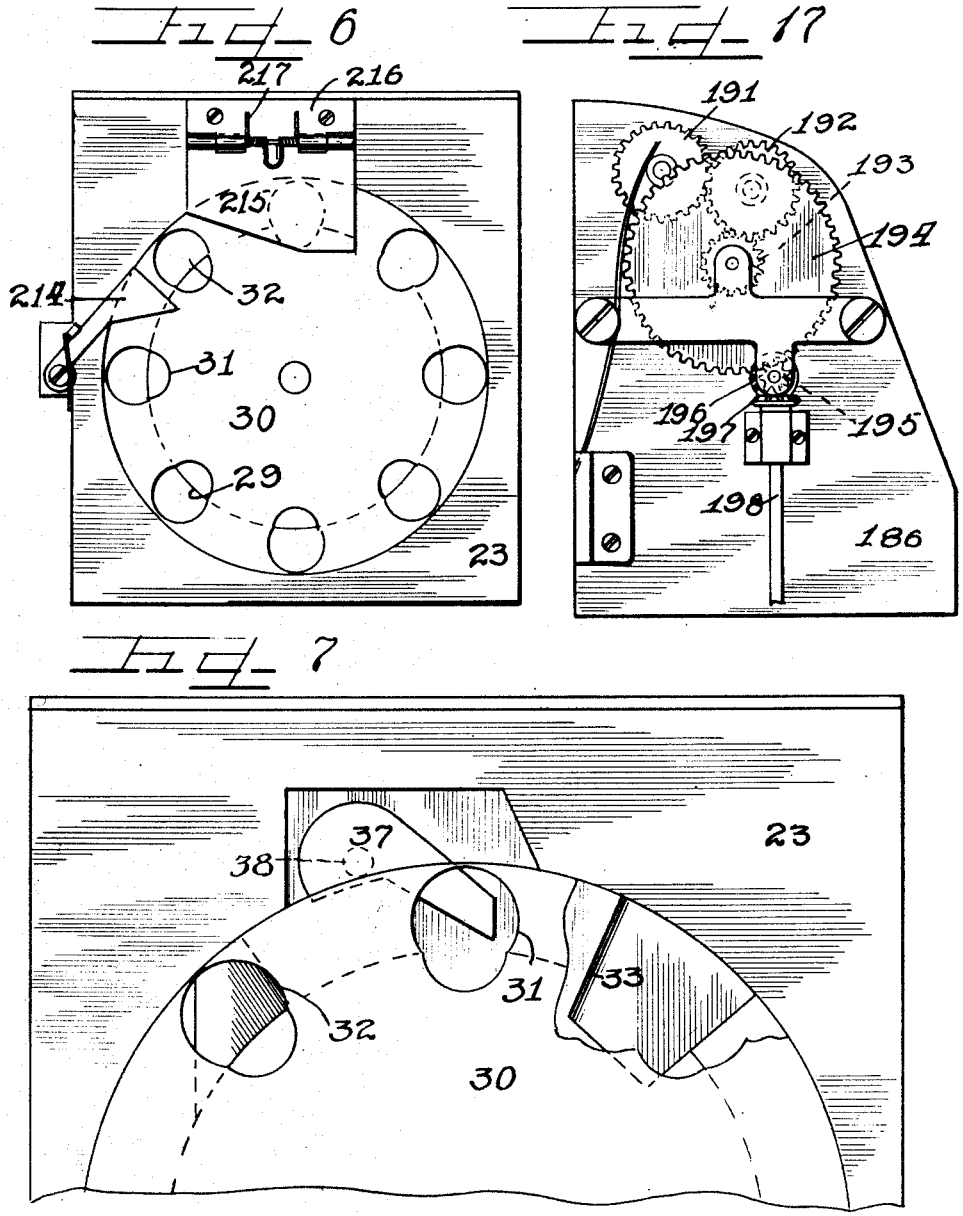

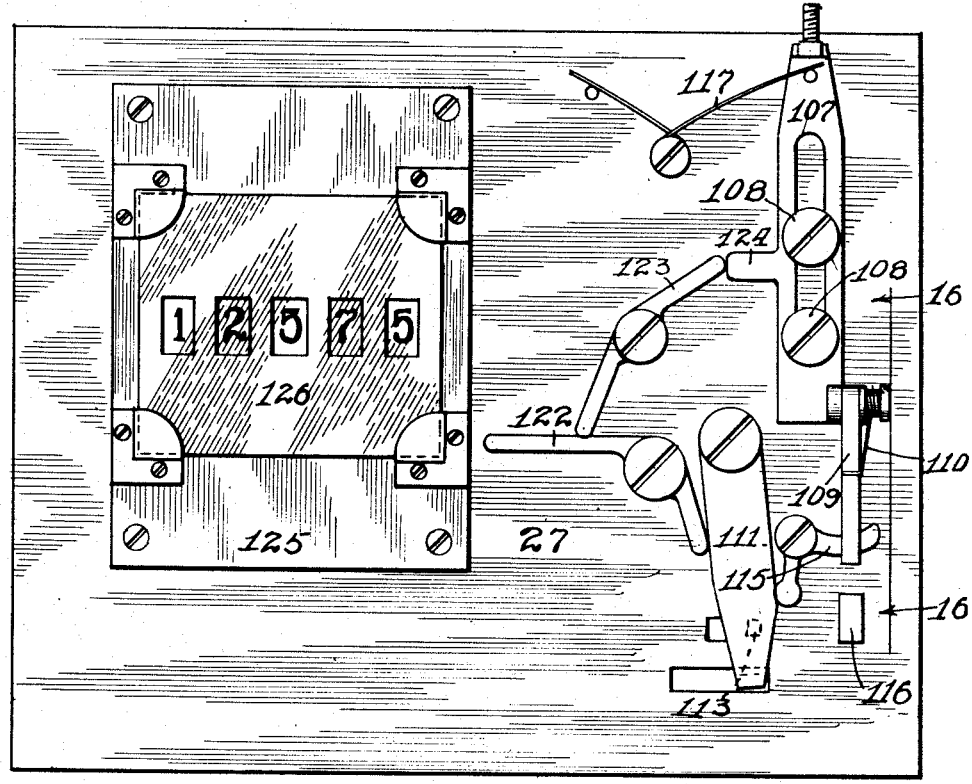
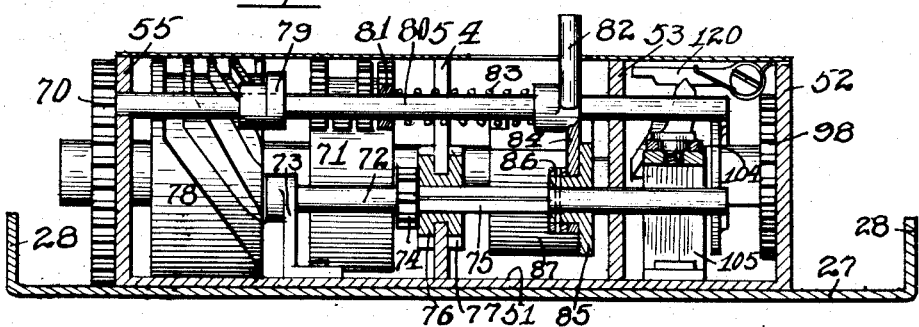

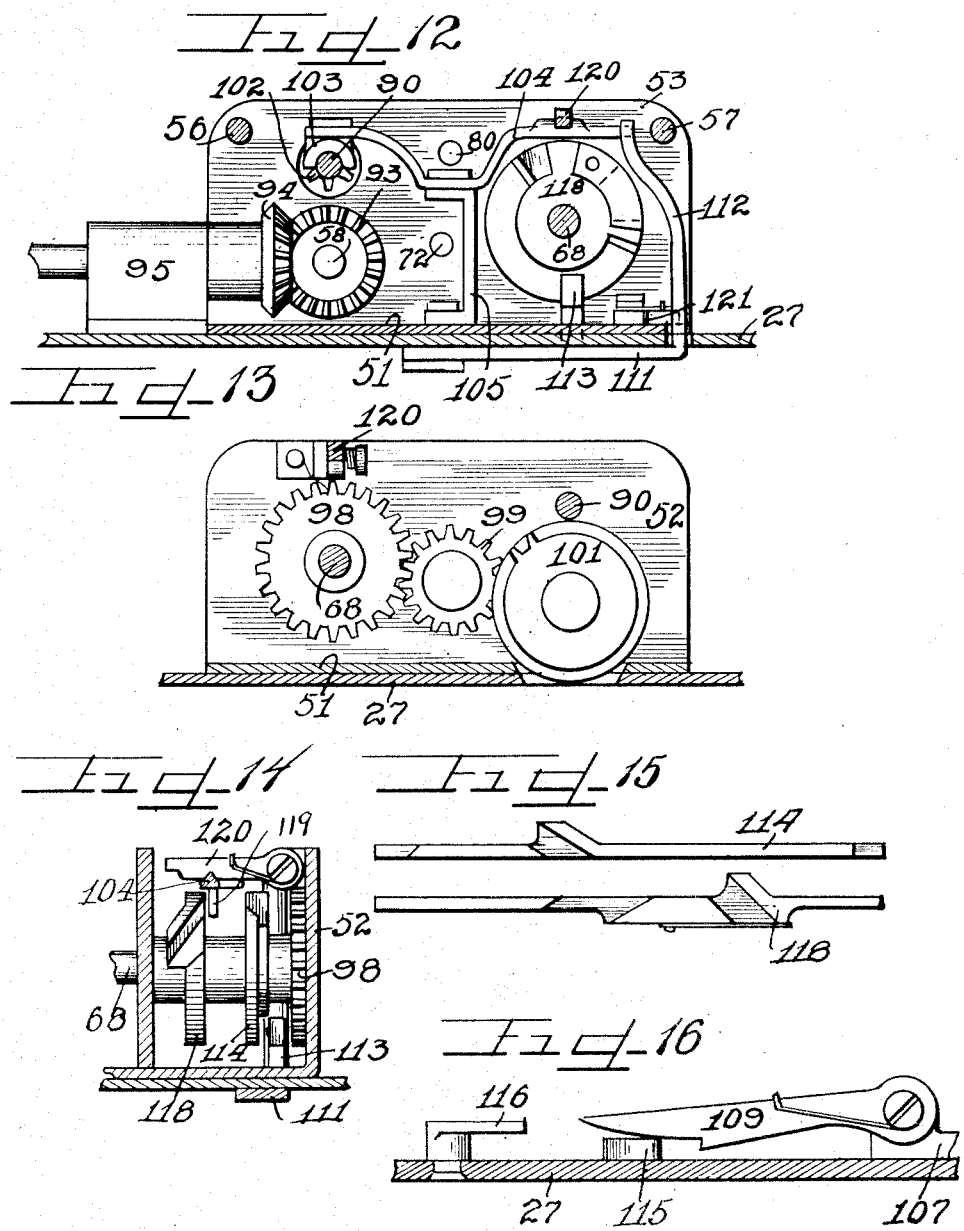

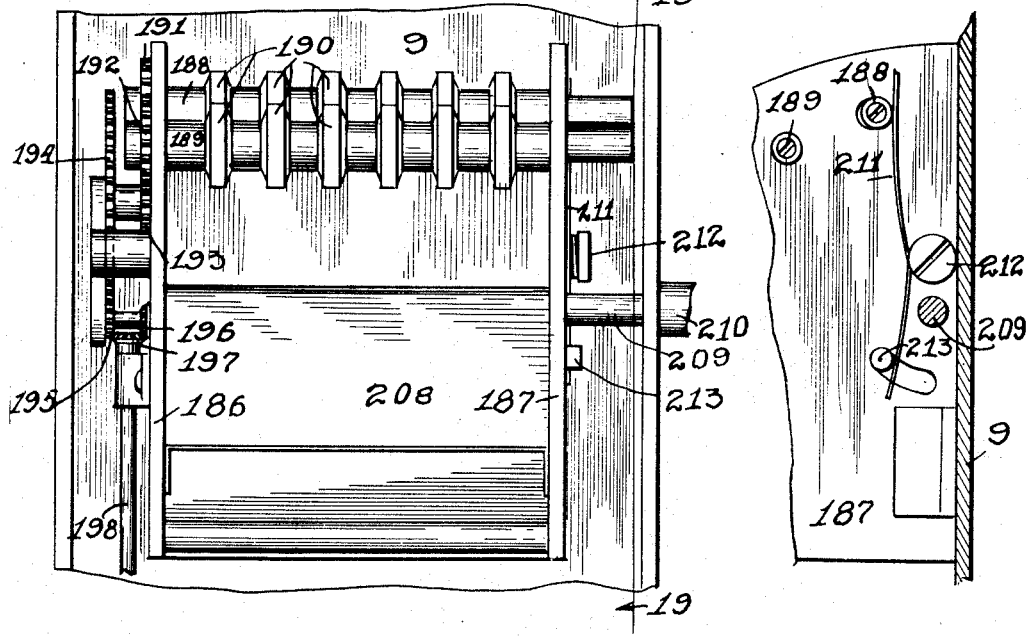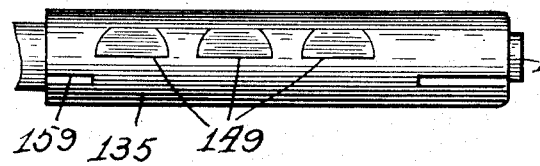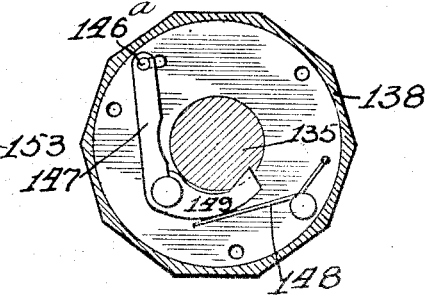

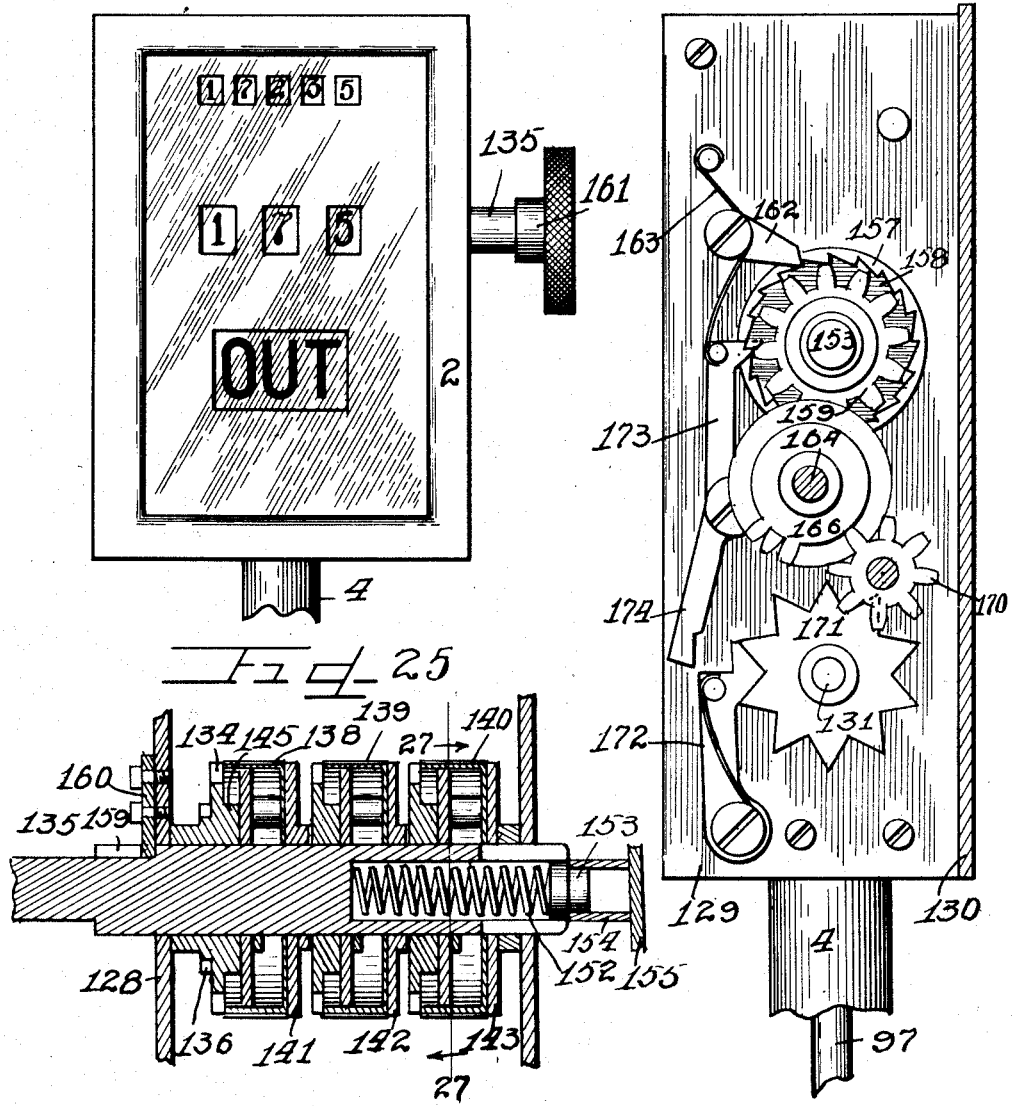

J. M. JOHNSON.
COIN AND TICKET FARE BOX AND REGISTER.
APPLICATION FILED NOV. 16, 1914.
1,344,898.
Patented June 29, 1920.
11 SHEETS—SHEET 10.
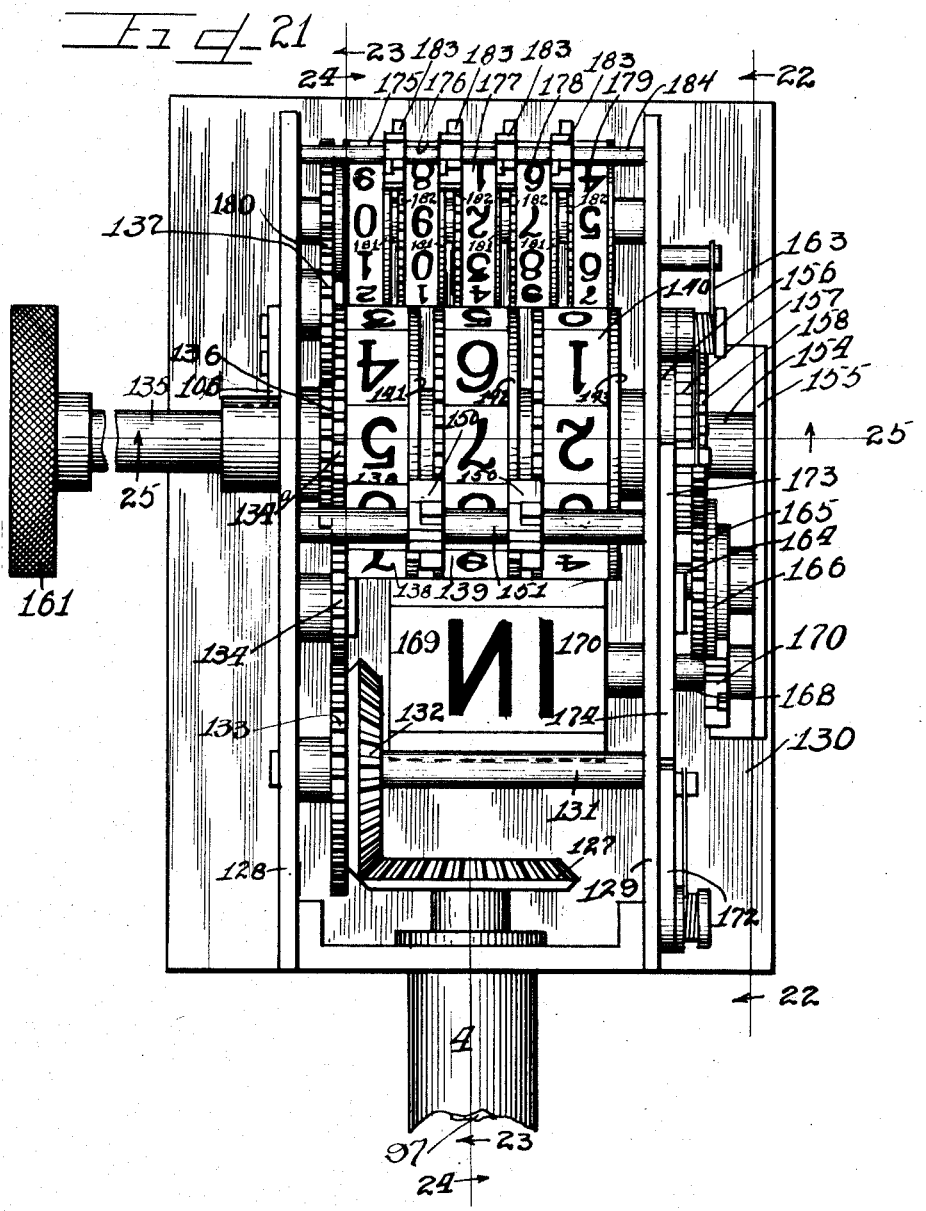

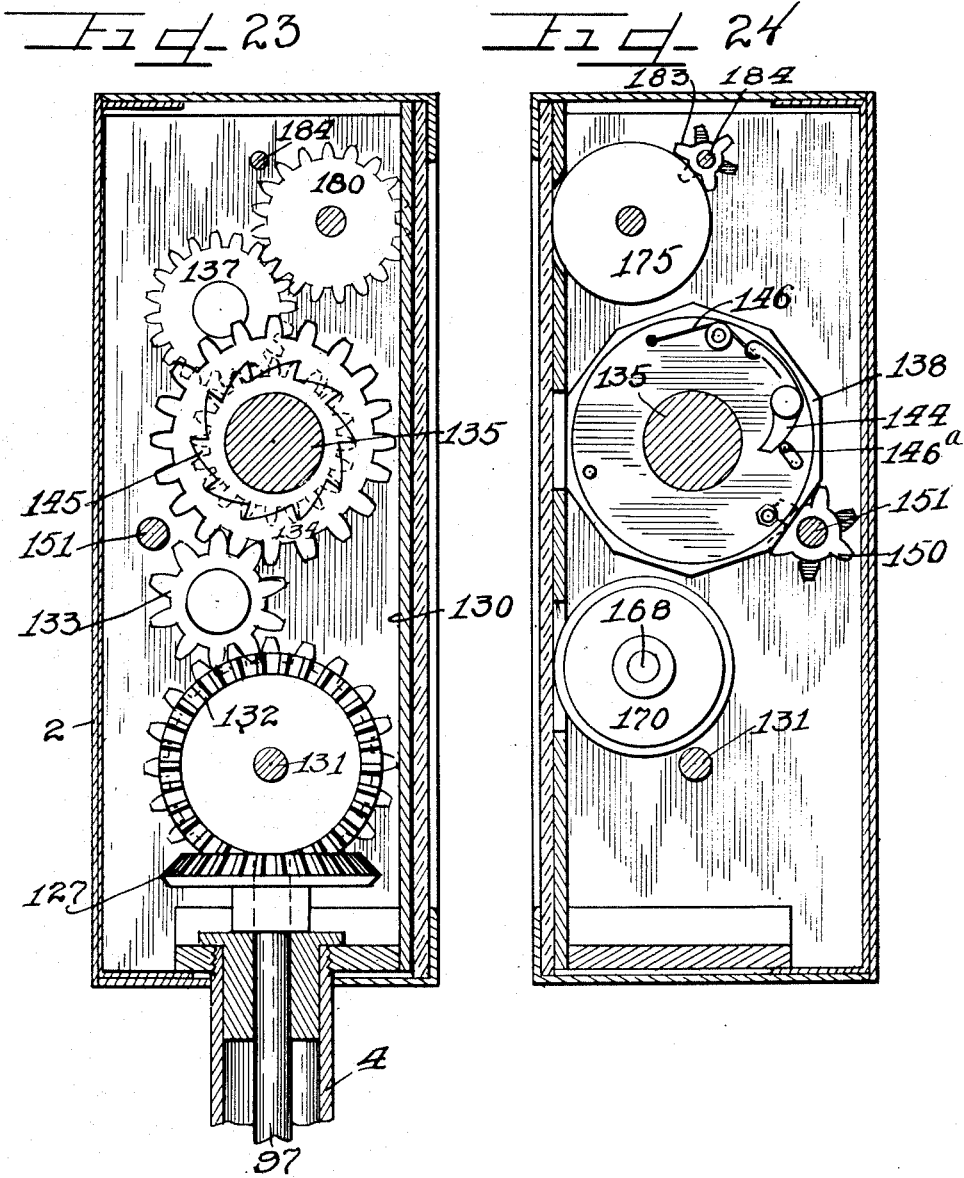

UNITED STATES PATENT OFFICE.

JAY M. JOHNSON, OF CHICAGO, ILLINOIS, ASSIGNOR, BY MESNE ASSIGNMENTS, TO JOHNSON FARE BOX COMPANY, OF CHICAGO, ILLINOIS, A CORPORATION OF NEW YORK.

COIN AND TICKET FARE BOX AND REGISTER.

1,344,898.  Specification of Letters Patent.  Patented June 29, 1920.

Application filed November 16, 1914. Serial No. 872,343.

*To all whom it may concern:*

Be it known that I, JAY M. JOHNSON, a citizen of the United States, and a resident of the city of Chicago, in the county of Cook and State of Illinois, have invented certain new and useful Improvements in Coin and Ticket Fare Boxes and Registers; and I do hereby declare that the following is a full, clear, and exact description of the same, reference being had to the accompanying drawings and to the numerals of reference marked thereon, which form a part of this specification.

This invention is designed particularly for use on street railway systems or interurban roads, but in fact is well adapted for numerous other uses where the collection of coins or tickets is necessary. By this invention not only is the total amount of the coins collected, registered, but likewise the total number of certain amounts, such as a five cent fare on street cars or the equivalent thereof in a ticket is also registered at a convenient point for observation.

It is an object of this invention to construct a fare receiving and coin counting device embodying mechanisms adapted to count coins of different denominations, totalizing the value thereof, and as well provided with mechanisms which count certain increments of value, such as a five cent fare, either in coins or tickets inserted into the machine.

It is also an object of this invention to construct a machine wherein coins are selectively picked up from an indiscriminate mixture of different denominations each coin registered and then passed to a place of deposit, all of the operations being automatically controlled by the mechanisms within the machine, the operator merely turning the crank thereof.

It is also an object of this invention to construct a fare register wherein power driven means are provided for driving the coin counting and registering mechanisms.

It is also an object of this invention to provide in combination with a fare register a passenger register, the mechanisms of which are entrained with the coin registering means to be driven thereby, said coin registering means receiving the drive from power mechanisms associated with the device.

It is also an object of this invention to construct a device provided with mechanisms for counting coins, the registering mechanisms being entrained with the driving means of the machine by the coin itself, and held in train independently of the coin until the coin has been registered, said registering mechanism acting to totalize the collection of coins of different denominations without adjustment of the machine on the part of the operator.

It is also an object of this invention to construct a device provided with mechanisms for receiving and counting coins, registering the total value thereof and as well provided with means for registering certain increments of value received in the form of either coins or tickets in the machine, as for instance a five cent fare, said latter registering means provided with a trip register which may be set back at the end of a run, as well as a totalizing register for showing the total number of fares collected at any time both in tickets and coins.

It is also an object of this invention to construct a device for counting and registering coins of different denominations, the entrainment of the proper registering mechanisms for the different coins being governed entirely by the coin itself, the means for the purpose being actuated the proper amount by contact with the coin, the different sizes of the coins of different denominations insuring a selective entrainment of the proper registering mechanisms with a power drive of the machine.

It is also an object of this invention to construct a machine adapted to receive transfers or tickets, as well as coins, with means for registering the total amount of the coins collected, as well as the total number of fares both in tickets, transfers and coins, and with means associated with the collection box of the machine for defacing the tickets or transfers to prevent further use thereof.

It is also an object of this invention to construct a machine wherein, by a simple operation on the part of the operator, means are caused to be entrained with the power drive to cause actuation of the passenger register mechanism independently of the coin registering means to indicate the collection of a ticket or transfer.

It is also an object of this invention to provide in combination with a coin counting registering means a totalizing register for the fares collected, both in tickets and coins, said latter mechanisms having two sets of registering devices entrained with one another, one adapted to be set back at the end of each trip, or whenever desired, and the other showing at all times the total number of fares collected.

It is also an object of this invention to provide a device employing means for moving the coins received in a hopper to counting position in a manner insuring counting of the coins one at a time to prevent errors in counting.

It is furthermore an object of this invention to construct a coin counting and fare registering machine wherein suitable safety mechanisms are provided to guard against attempts to defraud the machine by abnormal operation thereof.

It is finally an object of this invention to construct a compact machine easy to operate and not liable to get out of order, all of the operating mechanisms of which are inclosed within a suitable casing to prevent tampering therewith.

The invention (in a preferred form) is illustrated in the drawings and hereinafter more fully described.

In the drawings:

Figure 1 is a front elevation showing a completely assembled device embodying the principles of my invention.

Fig. 2 is a side elevation thereof.

Fig. 3 is a fragmentary front elevation partly in section and partly in elevation and broken away in parts to show the construction of the device.

Fig. 4 is a section taken on line 4—4 of Fig. 1.

Fig. 5 is a fragmentary section taken on line 5—5 of Fig. 1.

Fig. 6 is a front elevation of the coin carrying wheel journaled upon the stationary inclined plate within the machine.

Fig. 7 is an enlarged detail view of the upper end thereof partly broken away and with parts omitted to show the construction.

Fig. 8 is a face view of the coin counting registering mechanisms mounted upon the back plate within the machine.

Fig. 9 is an elevation of the opposite side of said back plate on which said registering mechanisms are mounted.

Fig. 10 is a section taken on line 10—10 of Fig. 8.

Fig. 11 is a section taken on line 11—11 of Fig. 8.

Fig. 12 is a section taken on line 12—12 of Fig. 8.

Fig. 13 is a section taken on line 13—13 of Fig. 8.

Fig. 14 is a section taken on line 14—14 of Fig. 8.

Fig. 15 is a development view of the shifting cams of the registering mechanism.

Fig. 16 is a fragmentary section taken on line 16—16 of Fig. 9.

Fig. 17 is a fragmentary detail view of the operating machanisms for the inking rolls in the upper end of the collection part of the machine.

Fig. 18 is a fragmentary view in elevation showing the inking rolls in the upper end of the collection box of the machine.

Fig. 19 is a fragmentary section taken on line 19—19 of Fig. 18.

Fig. 20 is an enlarged face view of the fare box register.

Fig. 21 is an interior rear view of the mechanisms within the fare box register.

Fig. 22 is a section taken on line 22—22 of Fig. 21.

Fig. 23 is a section taken on line 23—23 of Fig. 21.

Fig. 24 is a section taken on line 24—24 of Fig. 21.

Fig. 25 is a section taken on line 25—25 of Fig. 21.

Fig. 26 is a detail view of the set back shaft of the fare box register.

Fig. 27 is a section taken on line 27—27 of Fig. 25—25.

As shown in the drawings:

The assembled coin fare and passenger register are mounted upon an upright standard 1, the passenger register being denoted by the reference numeral 2, and the coin or fare register by the reference numeral 3, a long tubular standard or pipe 4, assisting in supporting said passenger register upon the fare register. A collection box 5, is built upon the fare register 3, and as shown is provided with a coin inspection compartment 6, the four sides of which are constructed of glass. As shown in Fig. 4 a ticket collection compartment 7, is provided within said collection box 5, and a light of glass 8, mounted in the front wall of the box permits inspection of the interior of said compartment. Said collection box 5, on its interior is provided with a partition wall 9, which, together with the back wall of the casing, serves to afford a long vertical compartment or passageway for coins, which may be inserted thereinto through apertures 10, at the upper end of the collection box. A plurality of baffle plates, affording a tortuous passage for the coin, are provided in said rear compartment of the coin collection box 5, said baffle plates being denoted respectively by the reference numerals 11, 12, and 13, respectively, and a coin after passing therebetween then falls into the inspection compartment 6, and rests upon a dumping floor 14.

Said dumping floor, as shown in Fig. 5, consists of two sections, which are mounted upon parallel shafts extending horizontally through the casing of the fare register. Rigidly secured upon one of the ends of each of said shafts within the casing, are cranks 15 and 16, each slotted and engaged by a floating pin 17, which is also engaged in the groove of an actuating crank 18, secured upon a shaft 19, which, on the exterior of the device is provided with an actuating crank 20. A chute 21, is disposed immediately beneath said dumping floor 14, and at its lower end registers with an aperture in a coin hopper 22, which is mounted upon an inclined stationary plate 23, within the device. A horizontal partition wall or floor 24, extends across within the fare register casing and supported thereon are triangular shaped side frame plates 25 and 26, respectively, which, along their inclined edges have said inclined plate 23, secured thereto. Extending vertically between said triangular frame plates is a back frame plate 27, the margins of which are flanged over for attachment to the outer surface of said triangular plates, as indicated by the reference numeral 28.

Said inclined stationary plate 23, is provided with a circular rib or track 29, extending almost entirely around on the surface thereof, and a circular coin carrying disk or wheel 30, having pockets 31, therein, is recessed into said inclined plate 23, with the upper surface of the disk flush with that of the plate. As clearly shown in Fig. 7, said rib 29, terminates at the point designated by the reference numeral 32, said rib inclining downwardly flush with the inner surface of the recessed portion of said plate 23. The shape of said coin pockets 31, is such that coins of various denominations seat in different positions therein, the pockets being capable of carrying nickels, pennies, dimes and Canadian five cent pieces.

An aperture 33, is cut through said plate 23, at a point swept over by said coin pockets in the disk, so that coins which have been registered may fall therethrough, the same passing into a chute 34, which conveys the coins downwardly, discharging the same into a suitable collection compartment 35, access to which is gained by a door 36, in the rear wall of the casing, and which, if desired, may be provided with a lock. A pivoted contact lever or cam 37, is mounted in a recess in the upper portion of said stationary plate 23, and normally lies in the path of coins swept over said plate, so that said cam lever contacts the periphery or edge of a seated coin and is raised thereby a certain amount. Of course coins of different sizes elevate said cam lever different amounts, and at different intervals with respect to the position of the coin on the stationary plate. The pivot shaft on which said cam lever is secured is denoted by the reference numeral 38, and extends through the plate 23, and on its opposite end has secured an arm 39. A small spiral spring 40, which is wound on said pivot shaft, is secured at one of its ends to said plate 23, and acts to normally impel said cam lever 37, downwardly into the path of coins carried by the coin wheel.

The drive for said coin wheel 30, which is secured upon a short shaft 41, extending through an enlarged central portion of said stationary plate 23, embraces a worm wheel 42, secured on said shaft and driven by a worm 43. The worm 43, is secured upon a main driving shaft 44, which extends through the fare register casing, being journaled in the respective triangular plates 25 and 26, and at its outer end having mounted thereon a pulley 45, about which is trained a belt 46, said belt also being trained about another pulley 47, on a shaft 48, journaled beneath the bottom of the fare register casing. Said shaft 48, receives its drive from a motor 49, by means of a worm and worm gear inclosed within a small housing 50. Coin counting or registering mechanism is mounted upon the back plate 27, and consists of a base plate 51, rigidly secured flat against the inner surface of said back plate 27 and having attached thereon parallel frame plates 52, 53, 54, and 55, respectively, disposed vertically and perpendicular to said base plate.

A pair of bolts 56 and 57, respectively, extend through said vertical frame plates with the takeup nuts disposed on the outer surfaces of the end plates 52 and 55, respectively. Journaled in said plates 53, 54, and 55, is a shaft 58, upon which are journaled register wheels 59, 60, 61, 62, and 63, respectively. As is usual in this type of counting register, each of the register wheels is provided on one side with a gear 64, and on the opposite side with a mutilated gear 65, so that the gear 64, of one register wheel is adjacent the mutilated gear 65, of the next register wheel, and it is through these gears that a complete revolution of one of the wheels serves to advance the adjacent wheel one unit. Accordingly a stationary shaft 66, is secured between the respective frame plates 54 and 55, beneath said bolt 56, and journaled thereon between each of the respective register wheels are small mutilated pinions 67, having alternate teeth of a greater width than the remaining teeth thereon, so that each of the teeth of said mutilated pinion mesh with a respective gear 64, of a register wheel and the teeth of greater width mesh with the mutilated gear of an adjacent wheel. Thus when one complete revolution of one of the register wheels has been made the one tooth of the mutilated gear thereon strikes the mutilated pinion, thus transferring one unit movement to the next adjacent wheel and each of said register wheels acts similarly upon the next adjacent wheel to transmit movement thereto at the proper intervals.

A driving shaft 68, is journaled through all four of said frame plates 52, 53, 54, and 55, respectively, receiving its drive from the main shaft 44, by means of a gear 69, secured on said main shaft and meshing with a gear 70, rigid on said shaft 68. A mutilated gear 71, is secured upon said shaft 68, between the respective frame plates 54 and 55, and has a plurality of rows or sets of teeth thereon, the first row having five teeth; the next, ten teeth; the next, one tooth; and the last, five teeth, said rows each capable of transmitting a drive to the registering mechanism for the registration of nickels, dimes, pennies and Canadian five cent pieces respectively.

For the purpose of entraining said mutilated gear with the register wheels when a coin is carried past counting position, thereby elevating the contact lever 37, a rotatable slidable shaft 72, is journaled in the frame plate 53, and in a bracket 73, secured upon said base plate 51. A small pinion 74, is rigid on said shaft 72, and moves therewith as the shaft slides into its various positions, the pinion meshing with one of the sets of teeth on the mutilated gear 71, when the shaft has been shifted. Said shaft 72, is provided with a squared portion 75, feathered on which are two integrally connected gears 76 and 77, respectively, which are held from movement as said shaft is shifted, by the plate 54, which is cut away to permit insertion of the shaft 72, into position.

The gear 77, which is feathered on said slidable shaft, meshes at all times with the gear 64, of the first register wheel 59, so that when said small pinion 74, is entrained with the mutilated gear 71, the drive to the register is effected to register the proper coin. In order to maintain said pinion 74, in mesh with the mutilated gear 71, until the coin has been registered, a cylindrical cam 78, is secured upon the shaft 68, and is provided with a plurality of grooves 78ª, four in number, each of different length, and one being provided respectively for the different denominations of coin, namely, nickels, dimes, pennies and Canadian five cent pieces. As clearly shown in Fig. 8, an inclined short entrance groove 78ᵇ is provided for each of the grooves on the cam 68, to permit a finger 79, rigid upon a slide rod 80, to enter any one of the respective grooves.

Said slide rod 80, is mounted for movement in the respective frame plates 53 and 55, and a long arm or bracket 81, is secured on the frame bolt 56, and extends over and above the register wheels into a position to assist in supporting said slide rod. Said slide rod 80, receives its movement from the aforementioned arm 39, connected to the cam which is beneath the coin wheel, and for this purpose a contact piece or arm 82, is rigidly mounted on said rod 80, in a position to be contacted by the tail of said arm 39.

A spiral compression spring 83, is wound about said slide rod 80, bearing at one of its ends against the contact piece 82, and at its other end against the bracket arm 81, said spring acting to resist a shifting movement of said slide rod. Said contact member or piece 82, is provided on its under side with an integral extension 84, and in which is journaled the hub of a star wheel 85, said star wheel being rigidly secured upon the slide shaft 72, by means of a pin extending through said shaft and the hub of said star wheel and a small collar 86, secured on said hub also acts to hold the star wheel rotatably engaged in said extension 84. Accordingly whenever said slide rod 80, is shifted, due to the connection between the same and said shaft 72, the shaft 72, is moved, and the pinion 74, thereon is brought into position for engagement with one of the sets of teeth on the mutilated gear 71.

A cylinder 87, is rigidly secured upon the drive shaft 68, and as clearly shown in Fig. 8, the side walls thereof are cut away in portions of different length corresponding to the length, measured in degrees, of the respective rows of teeth on the mutilated gear 71, so that when the shaft 72, is shifted the star wheel 85, is likewise moved into a position such that the teeth on the star wheel are permitted to rotate through the cut away portion of said cylinder 87. It is evident therefore, that when said shaft 72, is in a position such that the pinion 74, is not entrained with any of the sets of teeth on the mutilated gear 71, that rotation of said shaft 72, cannot take place, due to the engagement of the star wheel with the walls of said cylinder 87.

The shifting of the shaft 72, also serves to entrain mechanism for causing actuation of the mechanisms within the fare box 2, simultaneously with the registration of a coin, and for this purpose a gear 88, is journaled upon said shaft 58, and meshes at all times with the feathered pinion 76, on said shaft 72. Rigidly associated with said gear 88, is a mutilated gear 89, provided with two teeth disposed diametrically opposite one another. A slidable shaft 90, is journaled in the respective frame plates 52 and 54, and has integral therewith an elongated gear 91, which, as clearly shown in Fig. 8, is provided with teeth, adjacent ones of which are of different lengths, so that the same may be driven by the respective teeth and notches in the mutilated gear 89, and cannot rotate, except when in register therewith. Said elongated gear 91, although of course slidable with said shaft 90, always meshes with a gear 92, which is journaled on the shaft 58, adjacent the frame plate 53, and which is rigidly secured to a bevel pinion 93, also journaled on said shaft 58, and disposed on the opposite side of said plate 53. Consequently the gear 88, which is rotated once for each ten cents collected, or half a revolution for each five cent fare, by each half revolution causes one actuation of the elongated gear 91, which, of course, transmits the movement through the gear 92, to the bevel pinion 93. Said bevel pinion 93, meshes with another bevel pinion 94, secured upon a shaft journaled in a bearing 95, said shaft having secured on its other end a universal joint 96, which is connected to the fare box drive shaft 97.

Of course, when a ticket is collected it is desirable to register the same in the passenger register without actuation of the coin counting mechanism, and accordingly means are provided for driving said passenger register shaft 97, without actuation of the coin register means. For this purpose a gear 98, is rigidly secured upon the end of the shaft 68, adjacent the frame plate 52, and meshes at all times with an idler gear 99, which in turn meshes with another gear 100, journaled upon a stud shaft in said frame plate 52. A mutilated gear 101 having one tooth and notch, is rigidly associated with said gear 100, and is adapted to be entrained with a small elongated gear 102, integral with said slide shaft 90. A collar 103, is journaled upon said slide shaft 90, between said respective elongated gears 91 and 101, and is pivotally connected to a shifting lever 104, pivoted upon a bracket 105, secured upon the base plate 51, and offset around the slidable shaft 72. Accordingly when said shaft 90, is shifted the elongated gear 91, is disentrained from the mutilated gear 89, and the elongated gear 102, is entrained with the mutilated gear 101, and one complete rotation of said gear 100, causes one actuation of the gear 102.

Inasmuch as said elongated gears 91 and 102, are integrally connected, the drive to said gear 102, is transmitted to the bevel pinion 93, through said elongated gear 91, and consequently the drive is of course communicated to the passenger register shaft 97. A lever 106, is mounted on the exterior of the device in a convenient position for actuation by an operator, and when actuated serves to shift mechanism which acts automatically to entrain the drive of the coin registering means with the fare box shaft to effect the counting of a ticket in said fare box without causing actuation of the coin register.

On the front surface of said back plate 27, is mounted a slide bar 107, to which said lever 106, is integrally or otherwise rigidly connected, studs 108, engaging through a slot in said slide bar serving to hold the same in position on the plate. Pivotally mounted on the lower end of said slide bar in a manner to swing in a plane perpendicular to the plate 27, is a pawl 109, normally impelled inwardly toward said plate by means of a spring 110. A lever 111, is pivotally mounted on said plate, and is provided with a long extension 112, substantially at right angles thereto, which projects inwardly through a slot in said plate, and into a position adapted, when said lever is moved into an extreme position, to contact the outer end of said shifting lever 104. Said lever 111, is also provided with a tooth 113, which extends perpendicularly inwardly therefrom through a slot in said plate 27, and so disposed as to be positioned into the path of a cam 114, secured on said shaft 68, when said lever 111, is initially shifted.

The initial shifting movement of said lever 111, is effected by actuation of the small push lever 106, and for this purpose a small bell crank 115, is pivoted on the front surface of the back plate 27, with one of the arms disposed to be contacted by the pawl 109, and the other arm of said crank normally resting against the edge of the lever 111, so that as said slide bar 107, is depressed the lever 111, is moved a slight amount to one side. In order to immediately disconnect the pawl 107, from said bell crank 115, after the lever 111, has been shifted, a lug or cam projection 116, is formed or attached on the surface of said plate 27, and acts to elevate the pawl away from said bell crank, and the slide bar 107, is returned to initial position by means of a leaf spring 117, mounted on said back plate 27, and engaging beneath a stop on said slide bar. Consequently, further actuations of the lever 106, can have no effect on the mechanisms until the lever 111, has been returned to initial position.

However, said lever 111, having been initially shifted a certain amount by movement of the push lever 106, the cam 114, rotating with the shaft 68, strikes the toothed projection 113, thereby throwing the lever 111, to an extreme position, and consequently the extension 112, thereon strikes the outer end of the lever 104, shifting the same and consequently the elongated gears 91 and 102, respectively, therewith. After the fare box shaft 97, has been actuated, due to the entrainment of the gears caused by shifting of the lever 104, a cam 118, secured on the shaft 68, and rotating therewith strikes a depending pin 119, on the under side of said shift lever 104, thereby throwing the same back into initial position, disentraining the gears, and also returning the lever 111, into initial position. In order to hold said shift lever 104, in either one of its extreme positions a spring impelled pawl 120, is pivotally mounted on an extension of said plate 52, and is provided with a notched under edge, which engages a knife edge formed on the upper surface of said shift lever 104. Another spring impelled pawl or lever 121, is pivotally mounted upon the base plate 51, in a position to hold said lever 111, in initial position and after the same has been initially shifted by movement of the push lever 106, said spring impelled pawl 121, riding over the extension on said lever and holding the same from return to initial position, so that the tooth 113, is in the path of the rotating cam 114.

In order to prevent a shifting movement of the lever 111, except when said push lever 106, is actuated, a pair of interacting bell cranks 122 and 123, are pivotally mounted upon the front surface of said back plate 27, and the arrangement and position thereof is such that an integral extension 124, on the slide bar 107, lies in the path of movement of one of said bell cranks, which, contacting the other, and the latter contacting said lever 111, prevents movement thereof until said extension 124, has been moved out of the path of movement of the crank 123.

The back plate 27, is cut away directly beneath the register wheels, and secured on said plate is another plate 125, in which is supported a light of glass 126, through which the numerals on said register wheels are visible.

The passenger register 2, which is mounted in the elevated position shown clearly in Figs. 1 and 2, above the fare register, embraces a mechanism for displaying the total number of fares collected, as the number of fares collected for any predetermined distance, such as on an "Out" trip or on an "In" trip. The fare box shaft 97, extends upwardly through the tubular member 4, and at its upper end is provided with a bevel pinion 127, mounted within said passenger register casing. A pair of parallel frame plates 128 and 129, are mounted in vertical position within the fare box casing upon a back plate 130, and journaled between said plates 128 and 129, is a drive shaft 131, with a bevel pinion 132, rigidly secured thereon and meshing with said bevel pinion 127. Rigidly connected with said bevel pinion 132, is a gear 133, which meshes with an idler gear 134, journaled upon a stud shaft in said plate 128, which in turn meshes with a gear 134$^a$. Said gear 134$^a$, is journaled upon a slidable set-back shaft 135, mounted between said respective frame plates 128 and 129, and has associated therewith a small gear 136, which meshes with an idler gear 137. Journaled upon said shaft 135, are register number wheels 138, 139, and 140, respectively, each of said wheels having a mutilated gear, denoted respectively by the reference numerals 141, 142 and 143, rigidly associated respectively therewith.

As shown in Figs. 24, 25 and 27, mechanisms are provided within the number wheel 138, for normally maintaining the same locked for rotation with the gear 134, and this mechanism comprises a pawl 144, pivotally mounted within said number wheel and engaging a ratchet wheel 145, integral with said gear 134, and disposed within the interior of the number wheel. A leaf spring 146, is mounted on the interior wall of said number wheel, and acts normally to impel said pawl 144, out of engagement with the ratchet wheel, but said pawl is normally held in engagement by a pin 146$^a$, projecting through a slot in the wall of the number wheel. Said pin 146$^a$, is secured in the tail of another pawl 147, also mounted within the number wheel, but on the opposite surface of the wall thereof and a leaf spring 148, normally impels said pawl 147, inwardly toward the shaft 135. Each of the register number wheels is entrained with a respective gear in the same manner. Said slidable shaft 135, is provided with a plurality of notched portions 149, one for each of the register number wheels, and said notches are so positioned that said pawls 147, in each of the number wheels lie between the notches on the shaft when the parts are in normal position.

Of course, as is usual in counters of this type, mutilated pinions 150, are journaled upon a shaft 151, between the plates 128 and 129, normally meshing with the number wheel gears, and with the respective mutilated pinions, so that one revolution of the number wheel 138, will advance the number wheel 139, one unit, and similarly one revolution of the number wheel 139, will advance the number wheel 140, one unit. As clearly shown in Fig. 25, said shaft 135, is provided with an axial recess in one end in which is placed a spiral compression spring 152, said spring bearing at its outer end against a pin or stud 153, which is mounted in a tubular supporting member 154, integral with or attached to a plate 155, secured on the back plate 130. The purpose of inserting the small intermediate member 153, between said shaft 135, and the stud 154, is to permit removal of a recessed disk or cam member 156, a ratchet wheel 157, and a gear 158, all of which are integral with one another and slidably keyed upon the slotted end of said shaft 135. Said pin 153, serves to bridge the space between the end of said shaft 135, and the stud 154, to rotatively support the end of the shaft. Said shaft 135, at its other end is provided with a slot 159, which is normally engaged by a fixed key member 160, secured upon the stud plate 128, so that rotation of said shaft 135, is prevented, but, however, upon thrusting the shaft inwardly against the compression of the spring 152, the slot 159, is moved away from the key 160, and rotation of the shaft for adjustment of the number wheels is permitted. For this purpose a knurled actuating head 161, is secured upon the outer end of the shaft on the exterior of the casing 2, to effect the required adjustments.

A pawl 162, is pivotally mounted upon the vertical frame plate 129, and is normally impelled into contact with the ratchet wheel 158, by means of a spring 163, so that reverse rotation of said shaft 135, is prevented at all times. Another short shaft 164, is journaled between the frame plate 129, and the plate 155, and mounted thereon are an integrally connected gear 165, and a recessed cam or disk 166. Rigidly mounted upon a shaft which is journaled in said frame plates 129 and 155, is a flat faced indicating wheel 169, having on the opposite surfaces thereof the words "In" and "Out" respectively. Also secured upon said shaft is a small pinion 170, which is adapted to be actuated by the mutilated gear 166, so that each revolution of said mutilated gear causes movement of said pinion sufficient to rotate the flat faced indicating wheel the requisite amount.

Mechanism is provided for preventing adjustment of the main driving shaft 131, during a zero setting operation of the register wheels 138, 139, and 140, and for this purpose a star wheel 171, is secured upon the shaft 131, on the exterior surface of the frame plate 129, and a strong spring impelled pawl 172, engages the same at all times. The pitch of the star teeth on said star wheel is such that the movement transmitted through the passenger register shaft 97, causes a movement of the star wheel equal to the pitch of the star teeth thereof, so that after each of such movements transmitted to the passenger register, the pawl 172, acts to hold the mechanism from accidental movement or actuation.

A lever having one arm 173, positioned to engage the cam or recessed disk 156, is pivoted on said plate 129, with the other arm 174, thereof adapted to be swung inwardly against the upper end of said pawl 172, to prevent retraction thereof, therefore preventing rotation of the star wheel. Said spring 163, for the pawl 162, extends down and engages the arm 173, of said lever, acting to hold the same normally in toward its cam, so that the tooth on said lever engages within the recess of the cam, thus holding the arm 174, outwardly from the pawl 172, when the parts are all in a normal position.

Mounted between said frame plates 128 and 129, at the upper end thereof is a shaft on which are rotatably mounted register wheels 175, 176, 177, 178, and 179, respectively, the register wheel 175, being provided with a gear 180, normally meshing with the idler gear 137, which receives its drive from the gear 136, as already described. Said register wheels are each provided with a gear 181, on one side, and a mutilated gear 182, on the other side thereof, and the movement between the respective register wheels is transmitted by small mutilated pinions 183, journaled upon a shaft 184, which is mounted between said frame plates 128 and 129, the operation and construction of this type of register being well known and familiar.

Mechanisms are mounted within the collection box 5, to disfigure the tickets or transfers inserted therein. Accordingly, directly beneath a slot 185, provided in said collection box for the insertion of tickets or transfers therein, and journaled between vertical parallel frame plates 186 and 187, which form the walls of the compartment 7, hereinbefore referred to, are tubular shafts 188 and 189. A plurality of inking rolls, denoted respectively by the reference numerals 190, are mounted on said shafts 188 and 189, said inking rolls communicating with the interior of said shaft, in which a charge of ink is carried. At their ends beyond the frame plate 186, said shafts are provided with intermeshing pinions 191 and 192, the latter of which is driven by a small pinion 193, rigidly attached to a large gear 194. Said gear 194, meshes with a pinion 195, which is rigidly secured to a bevel pinion 196, and said bevel pinion 196, receives its drive from another bevel pinion 197, secured upon a long vertical shaft 198. As clearly shown in Fig. 3, said vertical shaft 198, extends downwardly and into the fare register 3, and is provided with a bevel pinion 199, meshing with a bevel pinion 200, which is connected upon a shaft which carries another bevel pinion 201. The bevel pinion 201, receives its drive from the bevel pinion 202, secured upon a short vertical shaft, which, at its lower end, has a bevel pinion 203, meshing with a large bevel gear 204, secured upon the main drive shaft 44, of the fare register.

Mechanisms are provided for dumping the tickets from the inspection compartment 7, downwardly into a collection compartment 205, access to which is gained by a door 206, provided with a lock 207. For this purpose a part of the inclined floor of the inspection compartment 7, consists of a pivotally mounted section 208, rigidly secured upon a shaft 209, which extends through the outer wall of the collection box casing, and is provided with an actuating handle or dumping lever 210. A long leaf spring 211, is wound about a stud 212, on the surface of the frame plate 187, and serves two purposes, namely that of yieldably holding the inking shaft 188, toward the shaft 189, the end of said shaft 188, being journaled in a slot in said frame plate and the other end of said leaf spring bearing against a projection 213, which forms a part of said dumping floor section 208, and projects through a slot in the frame plate 187, to hold said dumping floor normally in closed position. The other shaft 189, is also held yieldably toward the shaft 188, by a leaf spring connected on the frame plate 186.

The operation is as follows:

When a coin is inserted through one of the apertures 10, of the collection box it falls through the tortuous passage in the rear thereof downwardly into the inspection compartment 6, there resting upon the dumping floor 14. The operator then actuates the crank 20, dumping the coin and the same passes downwardly within the fare register into the coin hopper 22. The coin disk 30, may rotate continuously within said hopper driven by suitable connections from the motor 49, or the current may be switched on intermittently to drive said disk only from time to time. However, the coins in the hopper are picked up by the peculiar shaped pockets 31, in the coin wheel, and swept up over the stationary plate 23, the rib 29, formed thereon serving to prevent said coins seating in the pockets below the surface of the disk, so that there is no possibility of more than one coin being carried in a pocket with the coins superposed upon one another.

As the coins move upwardly on the coin wheel they are contacted by a spring actuated lever 214, which serves to insure proper seating of the coins in the pockets and just beyond said lever the rib 29, of said stationary plate terminates, so that the coin is permitted to seat within the coin pocket with the surface of the coin slightly below that of the coin wheel. As the coin moves toward the contact lever or cam 37, it passes beneath a stripper or presser plate 215, which is hingedly connected to a plate 216, secured on the stationary plate 23, with a spring 217, connected between said plates, normally impelling said presser plate 215, downwardly against the coin wheel. Said presser plate prevents deflection of a coin from the coin pocket as the coin passes beneath the cam lever 37. The cam lever 37, is moved upwardly different distances for different denominations of coin, and likewise the time at which such movement occurs is different for different coins, that is a larger coin throws the lever up sooner than a small coin.

The movement of the cam lever is transmitted through the arm 39, on the other side of the plate 23, to coin registering mechanism, said arm 39, serving to shift a rod 80, to one side by contact with a fixed contact piece 82, thereon. The movement of said rod is transmitted to the slide shaft 72, mounted parallel to said rod, so that the fixed pinion on said shaft is caused to be entrained with one of the sets of teeth on the mutilated gear 71, which is rotated synchronously with said coin carrying wheel, and the amplitude of shifting movement being determined by the coin itself, insures the entrainment of said pinion with the proper set of teeth for registration of that particular coin. The grooved cam 78, having a number of grooves, one for each denomination of coin, serves to hold the shifting rod, and consequently the slidable shaft, over in position until the coin has been registered, although the coin itself has passed beyond the cam lever 37, and fallen into the chute 34, and from there into the collection compartment 35. The finger 79, on said slide rod engages the proper groove in the cam, the same being rotated together with the mutilated gear synchronously with the coin carrying disk, so that the time of the shifting movement which is determined by the size of the coin, causes the engagement of said finger in the proper groove.

The recessed cylinder 87, coacting with the shifting star wheel 85, which is rigid upon the slidable shaft, serves to prevent rotation of said slidable shaft except when the same is shifted into a proper position, at such times the cut away portions of the rotating cylinders moving into the field of rotation of the teeth of the star wheel, so that the star wheel may freely move, the teeth moving through the recessed portions of the cylinder. It is obvious, however, that unless said shaft has been properly shifted or has not been shifted at all or is in a shifted position and the pinion is not meshing with the teeth on the mutilated gear, that the shaft cannot rotate, due to the fact that the recesses in said cylinder are not in proper position for registration with the teeth on the star wheel.

The pinion 76, which is integral with the pinion 77, both of said pinions being feathered upon said slidable shaft, serves to transmit the rotation imparted to the slidable shaft from the mutilated gear to the register wheels. In order to count the fares collected in the fare box 2, the elongated gear 91, meshes with the mutilated gear 89, forming a part of the gear 88, which is driven from the other integral pinion 77, feathered on the slide shaft, and said elongated gear 91, also meshes with the gear 92, which drives the bevel pinion 93, the register fare box shaft 97, receiving its drive therefrom through the bevel pinion 94. There are two teeth on the mutilated gear 89, so that with each complete revolution of the first register wheel, that is, denoting a registration of ten cents, two actuations of the elongated gear 91, are caused to take place, thus counting two fares.

When it is desired to register a ticket the operator depresses the lever 106, thereby, through the intermediation of the slide bar 108, and coacting levers, shifting the lever 111, slightly to one side, so that the tooth 113, thereon is in the path of the rotating cam 114. The cam strikes the tooth, thereby shifting the lever entirely over into an extreme position, and the tail 112, on said lever strikes the tail of the shifting lever 104, which moves the elongated gear 91, out of entrainment with the mutilated gear 89, and entrains the small elongated gear 102, with the mutilated gear 101, and the gear 91, being always in train with the gear 92, the drive from said mutilated gear 101, which is transmitted through gears from the shaft on which said mutilated gears are mounted, is transmitted to the passenger register shaft. Immediately after the registration of a ticket has taken place the rotating cam 118, strikes the depending pin 119, on the under side of said shift lever 104, throwing the same back into initial position, and consequently the lever 111, therewith, so that the small elongated gear 102, is disentrained and the initial arrangement of the parts, that is with the elongated gear 91, entrained both with the register mechanism and the passenger register shaft the driving means is again restored.

The position of the teeth on the mutilated gear 101, is such with respect to the grooves of the cam 78, that it is impossible to entrain the elongated gear 102, to register a ticket if any of the entrance points of the grooves in the cam are in position to receive the finger 79, that is to say when the tooth on the mutilated gear 101, is in engaging position for the elongated gear 102, the cam 78, has rotated to prevent that portion of its peripheral surface between the entrance ends of the grooves and the exit ends thereof to the finger 79. Of course the shaft 68, which carries the recessed cylinder, the mutilated gear, and the grooved cam is driven continuously, due to the intermeshing of its gear 70, with the gear 69, on the main drive shaft 44.

When a ticket is inserted through the slot 185, it falls with its edge between the inking rolls 190, which are driven continuously from the main drive shaft of the fare register, thereby drawing the ticket therethrough and inking the same on both sides to deface the same and prevent further use thereof. The operator inspects the ticket through the light of glass 8, as it falls upon the dumping floor of the compartment 7, and then actuates the lever 20, to drop the ticket into the compartment 205, from which it may be removed through the locking door 206, at the end of a day's run.

The fare box 2, has an indicating wheel with the words "In" and "Out" thereon, visible to the passengers of the car, likewise the figures of a trip register, and also the figures of a totalizer register which show the total number of fares collected. The trip register may be set back to zero at the end of a run by pushing inwardly upon the knurled head 161, and turning the same, this operation through suitable gears also serving to rotate the indicating wheel to display the other of either one of the words "In" and "Out" thereon and to move the trip register wheels to zero. This is accomplished by the shifting of the shaft 135, on which said knurled hand wheel 161, is secured, so that the cut away portions or notches 149, in said shaft engage the pawls 147, of the trip register wheels, so that as said shaft 135, is rotated through 360 degrees the notches therein finally come into a position to engage the pawls on said respective wheels, thereby moving the same, so that all of said register wheels are brought to zero position.

At this time the register wheels, each of which has a mutilated gear rigidly associated therewith on one side and a gear 134, on the other side thereof, may be disentrained from the gears 134. Accordingly within each of said register wheels on the wall thereof opposite to that on which the pawl 147, is mounted, is another spring impelled pawl 144, normally held in engagement with the ratchet wheel 145, which is integral with the gear 134, but upon movement of the pawl 147, into engaging position, the pin 146, thereon, projecting through the slot in the wall of the register wheel moves outwardly to permit disentrainment of the pawl 144, under the impulse of its spring from the ratchet wheel, so that the register wheel is free to rotate independently of said ratchet wheel and gear 134.

This is necessary for the reason that the main drive shaft 131, within the fare box is directly in train through a number of gears with the totalizing register wheels, and it is essential that these wheels be held locked from movement during an adjustment of the trip register. Accordingly a star wheel 171, is secured upon the stud shaft 131, and a spring impelled pawl 172, clicks thereover during normal operation of the device, but during a setting operation of the trip register the arm 174, of a lever swings downwardly to prevent outward movement of said pawl 172, thus holding said star wheel rigidly from movement. This movement of the arm 174, is effected by rotation of the shaft 35, which rotates the notched disk or cam 166, feathered on the outer end thereof, thus elevating the arm 173, out of engagement with the recess and throwing the arm 174, inwardly to locking position.

It is apparent that all the operations capable of performance by the machine are automatic. The two levers provided for actuation by the operator having no direct coaction with the mechanism, the lever 106, merely serving to place the parts into a position whereby the mechanisms automatically shift the same for registration of a ticket, and immediately disentraining the same so that they are restored to normal position, that is to register a collection of a fare both in the passenger register and in the fare register.

I am aware that various details of construction may be varied through a wide range without departing from the principles of this invention, and I therefore do not purpose limiting the patent granted otherwise than necessitated by the prior art.

I claim as my invention:

1. In a device of the class described the combination with a fare register, of a passenger register, means for actuating the fare register for registering the value of the coins of different denominations, driving connections between said means and said passenger register whereby said passenger register is actuated with each actuation of said coin registering means, mechanism for registering a ticket fare on said passenger register and power driven means for driving said fare register and passenger register.

2. In a device of the class described the combination with a passenger register, of a fare register, coin registering means for said fare register, mechanism for picking up and carrying coins of different denominations, power driven means for driving said coin carrying mechanism and registering means operating synchronously when entrained therewith, and connections between said passenger register and said registering means for the coins adapted to be broken to permit registration of a ticket fare on said passenger register independently of movement of said coin registering means.

3. In a device of the class described the combination with a passenger register, of a fare register, said fare register embracing coin registering means, said passenger register comprising a totalizing register to totalize the number of fares collected and a trip register capable of being set back independently of said totalizing register, and driving connections normally entrained with said passenger register and the coin registering means to cause actuation of the former when the latter is actuated, said connections adapted to be disentrained to permit actuation of the passenger register alone.

4. In a device of the class described the combination of a passenger register and a fare register, the latter embracing coin carrying and coin registering means, mechanisms contacted by the coin to entrain the drive for the coin carrying means with the coin registering means, operative connections between the passenger register and said coin registering means, a totalizer register and a trip register operatively connected within said passenger register, and means permitting setting back of said trip register independent of the totalizing register of the passenger register.

5. In a device of the class described the combination with a passenger register, of a money value register, mechanism for carrying coins of different denominations to operate the money value register, and total the value of said different denominational coins, registering means within the passenger register adapted to totalize the number of fares collected, another register, adapted to totalize the number of fares collected for each trip, and capable of being set back to zero independent of said first register means, and a power drive for said money value register and said passenger register register means.

6. In a device of the class described a power drive, coin carrying mechanism, registering means, mechanism entrained by the coin on said carrying mechanism with the drive and with said registering means to cause actuation of the latter, a passenger register operatively connected thereto, and normally entrained with said registering means to be driven thereby, and means shifting said passenger register into driving engagement with the power drive independently of said counting mechanisms to register a ticket.

7. The combination with a power driven fare register embracing coin registering means, of a passenger register operatively connected therewith adapted to be driven when said registering means is actuated, and mechanism for disentraining said passenger register from said registering means and entraining the same with the power drive to register a ticket in the passenger register independently of said registering means.

8. The combination with a power driven fare register embracing a power drive and coin registering means, of a passenger register operatively connected therewith and normally entrained with said registering means to be actuated simultaneously therewith, mechanism for disentraining said passenger register from said registering means and entraining the same with said drive to register a ticket independently of actuation of said registering means, a trip register and a totalizer register in said passenger register, and means permitting setting of said trip register to zero independently of adjustment of said totalizer register.

9. In a device of the class described coin carrying means, a power drive therefor, registering mechanisms for the coin, said coin carrying means adapted to carry coins of different denominations in different positions, mechanism adapted to entrain said registering mechanisms with the drive for said coin carrying means, and arranged to operate selectively in effecting such entrainment dependent upon the size of the coin, means for holding said entraining mechanism entrained, said means timed to compensate for the different intervals of operation of said selective entraining means due to the difference in sizes of the coins, a passenger register connected to said registering mechanisms adapted to be actuated thereby to indicate the number of fares collected, and mechanisms acting automatically to disentrain said passenger register from said registering mechanisms to permit operation thereof by said power drive independently of said registering mechanisms.

10. In a device of the class described coin carrying means adapted to carry different denominations of coins simultaneously, registering mechanisms to totalize the value of all the coins carried, a drive, entraining means operated by contact with a coin upon said carrying means acting to selectively entrain the proper registering mechanisms with said drive to add the coin value on said mechanism, a rotating member driven synchronously with said coin carrying means to hold said register mechanism entrained until a coin has been registered, said member then acting positively to shift said entraining means and disentrain said registering mechanism, mechanisms acting to prevent actuation of said register mechanisms except when properly entrained for movement, a passenger register embracing a trip register mechanism and a totalizer registering mechanism operatively connected with one another, and operatively connected with said first mentioned registering mechanism, means permitting said trip registering mechanism to be set to zero without actuation of the totalizer mechanism, and means disentraining said passenger register registering mechanism from said first mentioned registering mechanism.

11. In a device of the class described a fare register, mechanism for operating the register to totalize the value of the different denominations of coins collected, a passenger register operatively connected with said mechanism of said fare register to indicate the number of fares collected, comprising a trip register, and totalizer register, means permitting setting back of the trip register independently of movement of said totalizer register, and a power drive for said fare register for operating the coin registering mechanism and said passenger register.

12. In a device of the class described coin registering means, a passenger register operatively connected therewith adapted to be driven thereby to indicate the number of fares collected, said passenger register embracing a totalizer and trip register operatively connected with one another, mechanism for disentraining said passenger register from said coin counting and registering means to effect registration of a ticket on said passenger register independently of movement of the coin registering mechanism, and means permitting adjusting of the trip fare register independent of the totalizer in the passenger register.

13. The combination of a coin registering mechanism for coins of different denomination and a passenger register connected thereto adapted to totalize and indicate the number of fares collected, a trip fare register connected in said passenger register adapted to be set back, cam mechanism for disentraining said passenger register from said coin registering mechanism and entraining said passenger register with a drive to effect registration of a ticket independently of the coin counting and registering mechanism.

14. The combination with a passenger register and a fare register, of coin actuated mechanism for registering the value of the coins on the fare register, for mechanisms operating said passenger register with said fare register whereby the total number of fares collected are indicated in said passenger register, a trip register operable with said passenger register to indicate the total number of trip fares collected, means for setting back the trip register and means for locking the other registers from operation during the operation of setting back the trip register.

15. In a device of the class described the combination of a passenger register with a fare register, said fare register embracing coin registering means, said passenger register embracing registering mechanisms for fares collected, said mechanisms embracing a trip fare register and a totalizer fare register, mechanisms for disentraining the passenger register mechanisms from said fare register coin registering means in order to indicate the registration of a ticket, and defacing means mounted within the fare register and operatively connected to said coin registering means adapted to deface tickets inserted therein.

16. In a device of the class described the combination of a fare register with a coin registering means within the fare register, a passenger register comprising totalizing and trip fare registering mechanisms, the trip fare mechanism capable of being set back to zero independently of the totalizing mechanism, operative connections between said passenger register registering mechanisms and said fare register registering means whereby a coin collected is registered as a fare in the passenger register, means disentraining the passenger register mechanisms from the coin register registering means to register the collection of a ticket fare in the passenger register, and mechanisms operatively associated with the fare register to be driven by the coin registering means for defacing a ticket.

17. In a device of the class described the combination of a passenger register with a fare register, said passenger register comprising registering mechanisms for indicating fares collected, and embracing a trip fare register and a totalizing fare register, said trip fare register adapted to be set back independently of said totalizing fare register, coin registering means, operative connections between said coin register registering means and the passenger register registering mechanisms whereby the latter are driven by the former, mechanisms for disentraining the passenger register registering mechanisms from the coin register registering means to register the collection of a ticket fare on the passenger register, and means operatively connected with said registering means and mechanisms for defacing a ticket inserted into the fare register.

18. In a device of the class described, the combination with a coin registering means, a passenger fare register a drive for both thereof, ticket defacing means operatively connected to said drive, and means disconnecting the coin registering means from, and connecting said passenger fare register to said drive to register a ticket fare collected.

19. The combination with a coin registering means and passenger fare register operatively connected therewith and adapted to be disconnected therefrom, of a power drive therefor, and ticket defacing mechanism associated with said coin registering means and passenger fare register and continuously driven by said power drive.

20. The combination with coin registering means and a passenger fare register operatively associated therewith of a power drive for said coin registering means and passenger fare register, and defacing mechanism associated with said coin registering means and passenger fare register continuously driven by said power drive.

21. The combination with coin registering means and a passenger fare register operatively connected to said coin registering means, actuating mechanism for intermittently operating the coin registering means and fare register, of a ticket defacing mechanism operatively connected to said mechanism to operate continuously.

22. In a device of the class described, the combination of a coin registering means and a passenger fare register of a drive for both thereof, defacing means operatively connected to said drive, and means disconnecting the coin registering means and connecting the passenger fare register to said drive to register a ticket fare collected.

23. The combination with coin registering means of a passenger register operatively connected therewith, a power drive for said coin registering means and passenger register adapted to operate same intermittently and ticket defacing mechanism associated with said coin registering means and passenger fare register and operatively connected to said power drive to operate continuously.

24. The combination with coin registering means and a passenger fare register operatively associated therewith of a power drive for said coin registering means and passenger fare register, shifting mechanism to disconnect said power drive from said means and to connect said passenger fare register with said power drive, and ticket defacing means associated with said coin registering means and passenger fare register and operatively connected to said power drive.

25. The combination with coin registering means and a passenger fare register operatively connected thereto of a power drive to operate independently of the registering means and fare register for both thereof, and a ticket canceling mechanism operatively connected to said power drive.

26. In a device of the class described a constantly rotatable shaft, a coin totalizing register, a passenger register adapted to have the number of both coin and ticket passengers registered thereon, mechanism operated from the constantly rotatable shaft to both actuate the coin totalizing register and passenger register and mechanism operated from said shaft to register a ticket fare on the passenger register.

27. In a device of the class described a fare register, a passenger register, mechanism for actuating both registers by the coin fares received and mechanism adapted to cut out said mechanism and register to the passenger register for ticket fares.

28. In a device of the class described the combination of a coin carrier, a fare register, means actuated by a coin on the carrier for operating the fare register, a passenger register operable with the fare register and having resetting mechanism, and means to lock the coin carrier while the passenger register is being reset and to lock the resetting mechanism while the fare register is being operated by a coin on the carrier.

29. In a device of the class described a constantly driven shaft, a fare register, a mechanism adjusted by different sized coins to actuate the fare register from the driven shaft to register the value of the coin thereon, a totalizing passenger register operated from the driven shaft to register the number of passengers simultaneously with the operation of the fare register, a set back trip register operated from said driven shaft and means to prevent operation of the registers when the trip register is being set back and to prevent setting back of the trip register during the registering operation.

30. In a device of the class described a fare register, a constantly rotatable driving mechanism, a mechanism operated by the coins to connect the driving mechanism to operate the register, a passenger register, a mechanism operated from the driving mechanism to operate the passenger register, a set back trip register, a ticket registering mechanism to register a ticket in the passenger register and means to lock the registering mechanisms from registering operation when the trip register is set back and means to lock the trip register so as to be incapable of being set back during the registering operation.

31. In a device of the class described a fare register, a passenger register, a mechanism for operating the same together, a mechanism actuated by the different size coins for controlling the registration to said registers and a mechanism adapted to register to the passenger register independently of the operation thereof by the coin actuated mechanism.

32. In a device of the class described a fare register, a mechanism normally inoperative for operating the same, co-acting brake members for holding the register from movement when said mechanism is inoperative, mechanism operated by different sized coins to release the brake members and shift said mechanism into operative position to actuate the fare register, co-acting members for holding the mechanism in operative position until the value of the coin is registered and a spring for returning all of said parts to normal.

33. In a device of the class described a fare register, a passenger register, a trip register, a driving mechanism, a mechanism shifted automatically by the various sized coins to be driven by the driving mechanism to actuate the registers simultaneously and an amount corresponding to the value of the coin and a spring for automatically breaking the driving connections between the registers and driving mechanism after each actuation of the registers.

34. In a device of the class described a fare register, a passenger register, a trip register, a mechanism controlled by various sized coins for actuating the registers, a spring for holding said mechanism inoperative except when coins are being registered and a mechanism adapted to register a ticket to both the passenger and trip registers.

35. In a device of the class described a fare register, a passenger totalizing register, a trip register, a coin carrier and mechanism actuated by a coin thereon adapted to operate all of said registers simultaneously to register said coin, and means adapted to register to the totalizing passenger and trip registers independently of the fare register to register a ticket fare.

36. In a device of the class described a fare register, a passenger register, a trip register, a coin carrier, and mechanism actuated by a coin carried thereby, for actuating all of the registers in registering coin fares and a mechanism for cutting out the aforesaid mechanism and actuating only the passenger register and trip register in registering a ticket fare.

37. In a device of the class described a total coin register, a passenger register for both coin and ticket fares, a trip register for both coin and ticket fares, coin actuated means for operating the registers to register a coin, and mechanism for actuating the ticket register independently of the coin actuated means to register ticket fares.

38. In a device of the class described a total coin register, a total passenger register, a trip total passenger register, a trip register, an actuating mechanism for the registers, a mechanism operated by passing coins for controlling the registration of the registers from the actuating mechanism in registering the value of the coins and the number of passengers represented thereby and a mechanism adapted to be actuated from the actuating mechanism to register ticket fares to the same total passenger and trip registers that the coin fares are registered to.

39. In a device of the class described a fare register, a total passenger register, a trip register, a coin controlled mechanism for actuating all of the registers to register the value of the coin and the number of passengers and a mechanism adapted to actuate the total passenger register independently of the actuation of the fare register to register the number of ticket passengers thereon.

40. A coin and ticket registering machine comprising a coin register for registering the value of the coins, a total passenger register, a trip register, coin actuated mechanism for automatically operating all of the registers for coin fares and mechanism for operating the total passenger register and the trip register for ticket fares.

41. In a device of the class described a fare register, a total passenger register, a trip register, a coin registering mechanism normally in operative relation therewith to operate the registers to register the value and number of coin fares, a ticket registering mechanism for operating the passenger register and trip register for ticket fares and mechanism for cutting out either the coin registering mechanism or the ticket registering mechanism.

42. In a device of the class described a fare register, a total passenger register, a coin controlled mechanism for operating both said registers to register the total value of coin fares and the total number of passengers, a ticket registering mechanism for registering to the same total passenger register and a mechanism for rendering either of the aforesaid mechanisms inoperative.

43. In a machine of the class described, a fare box, a fare registering mechanism below the fare box, a passenger registering mechanism supported above the fare box, a tubular member supporting the passenger registering mechanism, a shaft extending through the tubular member from the fare register, and coin actuated mechanism for operating the registers.

44. In a device of the class described coin carrying means, a drive therefor, registering mechanisms for the coins, said coin carrying means adapted to carry coins of different denominations in different positions, mechanism adapted to entrain said registering mechanism with the drive for said coin carrying means, and arranged to operate selectively in effecting such entraining dependent upon the size of the coins, and rotatable grooved means for holding said entraining mechanism entrained, said means timed to compensate for the different intervals of operation of said selective entraining means due to the difference in size of the coins.

45. In a device of the class described coin carrying means adapted to simultaneously carry different denominations of coin, registering mechanism to totalize the value of all of the coins carried, a drive, entraining means operated by contact with a coin upon said carrying means acting selectively to entrain the proper registering mechanisms with said drive to add the coin value thereon, a rotating member having a plurality of grooves therein driven synchronously with said coin carrying means to hold said register mechanism entrained until the coin has been registered, said member then acting positively to shift said entraining means and disentrain said registering mechanism, and mechanisms acting to prevent actuation of said register mechanisms except when properly entrained for movement.

46. In a device of the class described coin carrying means, a register for the coins of different denominations carried on said means, driving mechanism for said register operated simultaneously with said coin carrying means, means operated by a coin on said means according to the size thereof to selectively entrain said register with the driving mechanisms to effect the registration of the coin, mechanisms associated with said register driving mechanism to prevent actuation of the register, except when the same is properly entrained with said driving means, and independent co-acting positively operating and resilient means both acting to restore said entraining mechanism to normal position after registration of a coin.

47. In a device of the class described rotatable coin carrying means for coins of different denominations, registering mechanisms for totalizing the value of the different coins carried by said means, a star wheel forming a part of said registering mechanisms, a drive for said register mechanisms connected for synchronous operation with said coin carrying means, an entraining mechanism operated by contact with the coins and acting to selectively entrain said registering mechanism with the proper drive dependent upon the time of movement of said entraining means transmitted thereto by the coin on said coin carrying means, a multiple grooved rotating member to retain said registering mechanism and its proper drive entrained until registration of the coin has been effected, resilient means acting to disentrain the register from its drive after registration of the coin, cylindrical means coacting with said star wheel to prevent actuation of said register when not entrained with the drive, and a fare box operatively connected with said registering mechanism to register the number of fares collected.

48. In a device of the class described, coin registering mechanism, a passenger register operatively connected therewith adapted to be entrained with and driven thereby to indicate the number of fares collected from passengers, and mechanism for disentraining said passenger register from said coin registering means to permit registration of a collected ticket on said passenger register independently of movement of the coin registering mechanism.

49. The combination of a coin registering mechanism for coins of different denominations and a passenger fare register connected therewith adapted to totalize and indicate the number of fares collected, and cam mechanism for disentraining said register from said coin registering mechanism and entraining said register with a drive to effect registration of a ticket independently of the coin registering mechanism.

50. The combination of a passenger register with a fare register and a drive for the latter, of mechanism operatively connecting said passenger register with said fare register, whereby the total number of passenger fares in coins collected are indicated in said passenger register, and means for disconnecting the passenger register from the fare register permitting said passenger register to be driven by the drive of said fare register to indicate the collection of a ticket independently of movement of said fare register.

51. In a device of the class described, coin carrying mechanism, registering means for coins of different denomination, entraining means operated by a coin on said coin carrying means to entrain said registering means with the drive for said coin carrying means, a cam having a plurality of grooves therein to hold said registering mechanism entrained with the drive according to the denomination of coin being registered, and a co-acting star wheel and recessed cylinder acting to permit actuation of said registering mechanism only at the time the same is entrained with the drive therefor.

52. In a device of the class described coin carrying means, a drive therefor, coin register mechanism adapted to register coins of different denominations carried on said means, a rotative cam element adapted to maintain said register mechanism entrained with the drive to effect proper registration of the coin and to positively disentrain said mechanism after such registration, a star wheel associated with said coin register mechanism, mechanism associated with said cam element for coaction with said star wheel acting to prevent actuation of the register mechanism except when properly entrained with the drive, and resilient means disentraining the register mechanism from the drive after registration of a coin.

53. In a device of the class described counting means for coins embracing a register, a drive therefor, a coin carrying mechanism, means adapted to entrain said register with the drive when the coins are carried on said mechanism past a certain point, a rotatable grooved cam, one groove for each denomination of coin to be registered, said cam adapted to hold said register entrained with the drive, a star wheel forming a part of said entraining means, and a recessed cylinder adapted to coact with said star wheel to permit rotation thereof only when said register is properly entrained with the drive.

54. In a device of the class described coin carrying means, a register for the coins, a drive for said coin carrying means and said register, means shifted by the coins on said means to entrain the register with said drive, rotating means having a plurality of grooves therein, one groove for each denomination of coin, said means maintaining said shifted means in entraining position and positively moving the same to disentraining position after registration of the coin.

55. In a device of the class described coin carrying mechanism, a drive to operate the same, a register for the coins totalizing the same according to their different denominations, driving means for said register, a mutilated gear forming a part thereof having a plurality of sets of teeth thereon, one for each denomination of coin to be registered, a slidably mounted shaft, a pinion thereon adapted to be entrained with said mutilated gear, a gear feathered on said slidable shaft and entrained with said registering mechanism to transmit the drive thereto when said pinion is driven by one of the sets of teeth on said mutilated gear, a rotatable cam having a plurality of grooves extending therearound, one for each denomination of coin, a slidable shifting rod connected to operate said slidable shaft, a finger on said shifting rod adapted to engage one of the grooves on said cam to hold said slidable shaft in position with the pinion thereon entrained with the mutilated gear, a contact member mounted adjacent the coin carrying means, mechanism associated therewith adapted to move said shifting rod to shift said slide shaft and pinion into proper entrained position, and resilient means acting to return said shift rod and slidable shaft into initial position after proper registration of a coin.

56. In a device of the class described coin carrying means for coins of different denominations, register mechanisms associated therewith adapted to totalize the value of the coins carried, a drive for said register mechanisms, a cylindrical cam forming a part of said drive and having a plurality of peripheral grooves thereon, one for each denomination of coin to be counted, a mutilated gear rigidly connected with said cam having a plurality of sets of teeth thereon, one for each denomination of coin to be counted, a cylindrical recessed member rigidly connected with said mutilated gear and cam, the length of the recesses therein dependent upon the particular denomination of coin to be counted, a slide rod mounted adjacent said cylinder mutilated gear and cam, a finger on said slide rod adapted to engage one of the grooves of said cam, a contact piece on said rod adapted to be moved when a coin on the carrying element passes a certain position to shift said rod to cause said finger to engage one of the grooves on the cam, a slidable shaft mounted adjacent said rod, a gear feathered thereon and in mesh with the register mechanism, a pinion rigid on said shaft adapted to be entrained with one of the sets of teeth of said mutilated gear, resilient means adapted to oppose entrainment movement of said rod and shaft, means on said cam adapted to positively move said shaft and rod out of entrainment position, and a star wheel secured upon said slidable shaft adapted to move and rotate therewith and when rotating moving through the recessed portions of said cylinder and acting to prevent actuation of said register shaft when the slidable shaft is not shifted into a proper entrainment position for registration of a coin.

57. In a device of the class described a coin carrying mechanism, a register to register the total value of coins of different denominations carried thereon, a drive shaft mounted adjacent said register, a cam and a mutilated gear rigid on said shaft, a slidable shaft, a pinion rigid thereon adapted to engage said mutilated gear, means adapted to engage said cam to retain said pinion and mutilated gear entrained, driving connections between the register and said slidable shaft, a recessed cylinder rigid upon said drive shaft, and a star wheel secured upon said slidable shaft adapted to rotate through the recessed portions of said cylinder when said pinion is properly engaged with said mutilated gear but preventing movement of said pinion by contact with the surface of said cylinder when said pinion is not entrained.

58. In a device of the class described the combination with a passenger register of a fare register comprising registering mechanism for totalizing the value of coins collected, driving means therefor, means associated with said driving means to maintain the register entrained with the drive until the coin value has been registered, driving connections between said register mechanism and said passenger register whereby said passenger register is driven to count the number of passenger fares collected, mechanism associated with the driving means for said fare register to prevent actuation of the fare register except when properly entrained with said drive, a plurality of cams associated with said driving means, and a shifting lever pivoted to be actuated by said cams to disentrain the passenger register mechanism with the driving means for said fare register, the arrangement of the parts being such as to permit such movement to take place only when said fare register is not entrained with said drive whereby a ticket collected may be registered in the passenger register independently of the coin register mechanism.

59. In a device of the class described the combination of a passenger register and fare register, coin registering means within said fare register to totalize the value of the coins collected, a mutilated gear associated with said registering means, driving connections for said passenger register connected in said fare register adjacent the coin registering means, a gear slidably mounted and normally entrained with said mutilated gear and said passenger register driving connections to transmit movement of the coin registering means to the passenger register to count the number of fares collected, a drive for said registering means, and mechanisms acting to shift said slidable gear out of engagement with the mutilated gear of the coin registering means and into engagement with said driving means to register a ticket in said passenger register without actuation of the coin registering means.

60. In a device of the class described the combination with a passenger register, of a fare register, means within the fare register to totalize the value of the coins of different denominations collected, said passenger register operatively connected therewith to indicate the number of fares collected, a lever mounted in said fare register adapted to be shifted by an operator, means brought into operation thereby acting automatically to disentrain the passenger register from the coin registering means of the fare register and causing the drive of the coin register to drive the passenger register to indicate the collection of a ticket and mechanism acting automatically to again entrain said passenger register with the coin counting means of the fare register.

61. In a device of the class described inclined coin carrying mechanism, a drive to operate the same, a register to count the coins totaling the value of the same according to the different denominations, a mutilated gear operated synchronously with the coin carrying mechanism, slidably mounted gearing adapted to entrain said register with said mutilated gear, means mounted adjacent said coin carrying mechanism adapted to be contacted by a coin thereon to shift said slidably mounted entraining gearing, a cylindrical cam member adapted to hold said gearing in entrained position until the value of a coin has been registered, and acting to positively move the gearing into disentrained position after such registration, and resilient means for assisting the movement of said gearing to such position.

62. In a device of the class described inclined coin carrying mechanism, means connected to be driven synchronously therewith, a register to register the coins, means contacted by a coin on said carrying mechanism to entrain the register with said synchronously driven means, a cylindrical grooved cam member for maintaining the register in train with said means until the coin has been registered, a passenger register normally entrained with said coin register to count the total number of fares collected, and means brought into operation by an operator to automatically disentrain said passenger register from said coin register, and entrain the same with said synchronously driven means to register the collection of a ticket.

63. The combination with a passenger register, of a coin registering mechanism, said mechanism embracing a register to totalize the value of coins collected, driving connections normally entrained between said register mechanism and said passenger register, means shifted by an operator to cause disentrainment of said passenger register from said coin register, and entrainment of the passenger register with constantly driven means within said coin register mechanism, and means acting to again entrain said passenger register with the coin register after a registering movement has been transmitted to the passenger register independently of the coin registering means.

64. In a device of the class described a coin carrying element for coins of different denominations, a register associated therewith adapted to totalize the value of the coins carried, a drive for said coin carrying element, means entraining the register therewith by contact with a coin on said element to cause registration of the coin, a passenger register normally entrained with said coin register to register the number of coin fares collected, a lever shiftable by an operator, and mechanisms brought into operation automatically by movement of said lever to disentrain the passenger register from said coin register and entrain the same with the drive for said coin carrying element to register the collection of a ticket.

65. In a device of the class described a coin carrying element for coins of different denominations, a register associated therewith adapted to totalize the value of the coins carried, a drive for said coin carrying element, means entraining the register therewith by contact with a coin on said element to cause registration of the coin, a passenger register normally entrained with said register to register the number of coin fares collected, a lever shiftable by an operator, mechanisms automatically brought into operation after movement of said lever to disentrain the passenger register from said coin register and entrain the passenger register with the drive for said coin carrying element to register the collection of a ticket, and mechanisms operating automatically to disentrain said passenger register from said drive and again entrain the same with said coin register after the registration of a ticket.

66. In a device of the class described registering means for a coin, a drive for said registering means, mechanism for entraining said registering means with said drive, a cylindrical rotating cam acting to maintain said registering mechanism entrained with the drive until a coin has been registered, and a coacting star wheel and recessed cylinder, said star wheel slidably movable with respect to said cylinder acting to permit movement of the register mechanism only when the same is properly entrained and positive and resilient means for disentraining the register after registration of a coin.

67. The combination of a passenger register and a fare register, the latter embracing coin registering means normally entrained with said passenger register to drive the passenger register to indicate fares collected as the coins are registered, a drive within said fare register, shifting means mounted for actuation by an operator, mechanism acting automatically when said shifting means is actuated to disentrain the passenger register from the coin register and cause entrainment with said drive to register a ticket, and means preventing movement of said mechanism except when said shifting means has been operated.

68. The combination with a passenger register and a fare register, the latter embracing coin registering means normally entrained with said passenger register to drive the passenger register to indicate fares collected as the coins are registered, shifting means mounted for actuation by an operator, mechanism acting automatically when said shifting means has been actuated to disentrain the passenger register from the coin register and cause actuation of said passenger register to register a ticket, and said mechanism acting to entrain said passenger register with said coin register after registration of the ticket, and means preventing movement of said mechanism except when said shifting means has been operated.

69. In a device of the class described the combination of a fare register and a passenger register normally entrained, operative connections between the fare register and the passenger register to cause registration of a passenger fare in the passenger register with the counting of the coin in the fare register, means for disentraining the passenger register from the fare register to register the collection of a ticket, and mutilating means associated with the fare register adapted to mutilate the tickets after delivery thereinto.

70. In a device of the class described the combination of a passenger register and a fare register, coin counting means within the fare register, operative connections between the fare register and said passenger register to transmit a drive through the coin counting means to said fare register to register a coin fare in said fare register, means for disconnecting said connections of the passenger register from said coin counting means to register the collection of a ticket, and mutilating devices associated with the fare register to mutilate tickets inserted therein.

71. In a machine of the class described a fare register, a rotatable mutilated gear member having sets of teeth thereon, a rotatable grooved cam element, a rotatable brake cylinder having grooves therein corresponding to the sets of teeth, and simultaneously adjustable gear, star wheel and arm for coacting with the mutilated gear, coin element and brake cylinder for actuating the register to totalize the value of the coin thereon and to prevent accidental actuation of the register.

72. In a machine of the class described, a register, mechanism for actuating the same, a grooved cam for holding the actuating mechanism in operative position during the registering operation, and means rotatable with the cam to prevent overtravel thereof and to prevent accidental rotation thereof.

73. In a machine of the class described, a register, mechanism for actuating the same, a grooved cam for holding the actuating mechanism in operative position during the registering operation and adapted to disentrain the actuating mechanism at the end of each actuation of the register, and a notched member and star wheel for preventing overtravel of the register and preventing accidental actuation thereof.

74. In a machine of the class described, a register, mechanism for actuating the same, a grooved cam for holding the actuating mechanism in operative position during the registering operation and a member rotatable with the grooved cam element to prevent accidental actuation of the actuating mechanism.

75. In a device of the class described, a register, a shaft, a gear thereon at all times in mesh with the register, a mutilated gear, a gear adjustable on said shaft to engage the mutilated gear, a cam member provided with peripheral grooves and means coacting with the cam member to engage in one of the grooves to hold the adjustable gear in mesh with the mutilated gear during the registering operation.

76. In a device of the class described, a register, a mutilated gear and pinion for actuating the same, normally out of mesh, mechanism operated by the coin for shifting the pinion to mesh with the mutilated gear, a grooved cam cylinder and a member adjustable with the pinion adapted to engage in one of the grooves to hold the pinion and gear in mesh until the register has been properly actuated.

77. In a device of the class described, a register, a mutilated gear and pinion for actuating the same normally out of mesh, mechanism operated by the coin for shifting the pinion to mesh with the mutilated gear, a grooved cam cylinder, a member adjustable with the pinion adapted to engage in one of the grooves to hold the pinion and gear in mesh until the register has been properly actuated, a brake cylinder provided with grooves therein and a member movable with the pinion adapted to ride on the brake cylinder when the pinion and mutilated gear are out of mesh and adapted to engage in one of the grooves when the pinion and mutilated gear are in mesh.

78. A coin registering machine comprising a coin register, mechanism controlled by coin for actuating the same, a grooved cam cylinder for controlling the duration of the actuation of the register by said mechanism and a grooved cylinder and star wheel for preventing accidental actuation of the register.

79. In a device of the class described, a register, a mutilated gear and pinion for actuating the same, mechanism operated by the coin for shifting the pinion to mesh with the mutilated gear, a grooved cam cylinder and a member adjustable with the pinion adapted to engage in one of the grooves to hold the pinion and gear in mesh until the register has been properly actuated, said cam cylinder adapted to force the pinion out of mesh with the mutilated gear after each coin is registered.

80. In a machine of the class described, a register, a shaft, a cylinder thereon provided with sets of teeth, a cylinder thereon provided with cam grooves, a cylinder thereon provided with cut away portions, a shiftable gear adapted to selectively engage one of the sets of teeth to actuate the register, a shiftable member adapted to engage a groove in the cam cylinder to hold the gear in mesh with said set of teeth and a shiftable member adapted to engage one of the cut away portions in said cylinder when the register is actuated and at all other times to engage the periphery of the cylinder.

81. In a device of the class described, a register, a cylindrical cam element, a cylindrical gear element, a cylindrical element for preventing accidental actuation of the register and simultaneously shiftable mechanism coöperating to engage and disengage said cylindrical elements to actuate the register for each coin an amount corresponding to the value of the coin and for holding the register when not registering a coin from accidental actuation.

82. In a machine of the class described, a register, a plurality of simultaneously rotatable cylindrical elements and a plurality of simultaneously shiftable elements coacting therewith to actuate the register to register the value of the coin thereon, to prevent excess actuation of the register and to prevent accidental actuation of the register.

83. In a machine of the class described, a register, a plurality of mechanisms adapted to be adjusted by coins passing a certain position, and a plurality of cylindrical toothed and grooved elements adapted to be engaged and disengaged by the said mechanisms for controlling the actuation of the register to register the value of the passing coins thereon.

84. In a machine of the class described, a register, a plurality of mechanisms adapted to be adjusted by coins passing a certain position, a plurality of cylindrical toothed and grooved elements adapted to be engaged and disengaged by the said mechanisms for controlling the actuation of the register to register the value of the passing coins thereon, and means for positively effecting the disengagement of said mechanisms from the cylindrical elements.

85. In a device of the class described the combination with a coin carrying element, of registering means to count the coins moved by said element, a coin lever adapted to be elevated by the peripheral edges of the coins on said element, a mutilated gear to drive said register, and a grooved cam member coacting with said coin lever to elevate and maintain the same elevated sufficiently to entrain the mutilated gear with the register as it drives the register.

86. In a device of the class described the combination with an inclined coin carrying element, of driving means therefor, a shaft mounted parallel said coin carrying element, a mutilated gear thereon having a plurality of gears in a different plane, a cam element mounted on said shaft having a plurality of cam grooves, one for each gear, a register, and a coin lever mounted over the face of said coin carrying element adapted to be elevated by coins thereon to entrain said register with said mutilated gear, said cam acting to maintain the same entrained.

87. In a device of the class described the combination with an inclined coin carrying element, of a shaft, driving connections between said element and said shaft, a cam element mounted on said shaft, a coin lever mounted over the face of said element adapted to be elevated by contact with the peripheral edge of coins thereon, a register, mechanism operated by said lever to move into engagement with said cam, said mechanism adapted to entrain the register with the mutilated gear after said mechanism has been moved into engagement with the cam.

88. In a device of the class described, the combination with a rotatable coin carrying element mounted in inclined position, of a shaft, a composite mutilated gear mounted upon said shaft comprising a member having a plurality of gears arranged opposite one another longitudinally of the shaft, a grooved cam element mounted on said shaft beneath said mutilated gear having a groove for each gear, mechanism actuated by a coin on said element to move into engagement with said cam element, a register, and means entraining the same with said mutilated gear by movement of said mechanism engaged with said cam.

89. In a device of the class described the combination with a coin carrying element and coin register, of a mutilated gear provided with a plurality of gears lying in a different plane adapted each to be entrained with the register to actuate the same, a grooved cam element mounted co-axially with said mutilated gear and having a groove for each gear, a coin lever mounted over the face of said coin carrying element adapted to be elevated by coins carried thereon, mechanism operated by said lever to move into engagement with said cam, and means operatively connected therewith to be moved by said mechanism to maintain the mutilated gear and register entrained with one another.

90. In a machine of the class described, a separator and conveying mechanism for coins of various denominations, a register, a drive therefor, a coin lever pivoted adjacent said conveyer and separator mechanism adapted to contact the periphery of coins properly carried upon said conveyer and separator mechanism, means shifted thereby to entrain the register with the drive therefor, and peripherally grooved means acting positively to hold said coin lever and shiftable means in a shifted position during actuation of the register and positively returning the same to normal position immediately thereafter.

91. In a machine of the class described, a coin selecting and conveying element, a register, a drive therefor, means for entraining said register with said drive, a coin lever adapted to be contacted by the periphery of the coins on said conveying element to shift said means and entrain the register with the drive therefor, a grooved cam element for maintaining said means in a predetermined shifted position during registration of a coin and guiding mechanism for preventing rotation of a certain part of said means as the same is shifted.

92. In a device of the class described the combination with a coin carrying and selecting element for coins of various denominations, of registering means to count the coins moved by said element, a coin lever adapted to be elevated by the coins on said element, mutilated gears lying in different planes, each adapted to drive said register, a grooved cam member having a plurality of cam grooves, one for each gear, adapted to elevate and maintain the coin lever elevated sufficiently to entrain the respective mutilated gears with the register, and mechanism engaging said grooved cam member by which said coin lever is held elevated, said mechanism being capable of sliding movement but prevented from rotation.

93. In a device of the class described the combination with an inclined coin carrying element, of driving means therefor, a shaft, a mutilated gear thereon, a cam element mounted on said shaft, a register mounted adjacent said coin carrying element, a coin lever mounted at the edge of said coin carrying element adapted to be elevated by contact with the peripheral edges of coins thereon to entrain said register with said mutilated gear, and mechanism co-acting with said cam element to maintain the register and said mutilated gear in driving relation to register a coin.

94. In a device of the class described the combination with an inclined coin carrying element, of driving means therefor, a shaft, a mutilated gear and a cam element mounted on said shaft, a register, shiftable means adapted to entrain said register with said mutilated gear, mechanism movable with said means adapted to engage said cam element to maintain said means in a shifted position, and a coin lever mounted over the face of said coin carrying element adapted to be elevated by contact with the edge of coins thereon to move said mechanism into engagement with said cam.

95. In a device of the class described the combination with an inclined coin carrying and selecting element, a shaft, driving connections between said element and said shaft, a plurality of connected mutilated gears lying in a different plane secured on said shaft, a cam element on said shaft, a coin lever mounted over the face of said element adapted to be elevated by coins thereon, a register, mechanisms shifted by said coin lever to move into engagement with said cam, guiding means to prevent rotation of said mechanism, and gearing adapted to entrain the register with the mutilated gear after said mechanism has been moved into engagement with the cam.

96. In a device of the class described the combination with a rotatable coin carrying element mounted in inclined position, a shaft, a composite mutilated gear mounted upon said shaft, a grooved cam element mounted on said shaft beneath said mutilated gear having a groove for each gear, mechanism actuated by a coin on said element to move into engagement with said cam element, guiding means for said mechanism to prevent rotation thereof, a register, and means entraining the same with said mutilated gear by movement of said mechanism.

97. In a device of the class described the combination with a rotatable coin carrying element, of a shaft mounted adjacent thereto, a composite mutilated gear mounted upon said shaft, a grooved element mounted on said shaft beneath said mutilated gear, another shaft slidably mounted adjacent said first mentioned shaft, a register, a gear on said second mentioned shaft adapted to be moved into engagement with said mutilated gear, a gear on said second mentioned shaft adapted to drive said register when said first mentioned gear is in engagement with said mutilated gear, mechanism actuated by a coin on said carrying element to shift said first mentioned gear into engagement with said mutilated gear, and mechanism mounted on said second mentioned shaft adapted to engage said cam element to maintain said gears between said register and said mutilated gear entrained to effect registration of a coin.

98. In a device of the class described the combination with a coin carrying element and coin register, of a mutilated gear adapted to be entrained with the register to actuate the same, a gear slidably mounted adapted to be moved into engagement with said mutilated gear, a shaft movable with said gear, a gear feathered on said shaft normally in train with said register acting to drive the register when said first mentioned gear is shifted into engagement with said mutilated gear, a grooved cam element mounted adjacent said mutilated gear, a coin lever mounted adjacent the carrying element adapted to shift said slidable gear toward said mutilated gear, and mechanism associated with said slidable shaft adapted to engage said cam element to complete the shifting movement of said slidable gear into engagement with said mutilated gear and to hold the same entrained until complete registration of the coin which elevated said coin lever is effected.

99. In a device of the class described the combination with an inclined coin carrying element, of driving means therefor, a shaft mounted adjacent to said coin carrying element, mutilated gears on said shaft lying in a different plane of rotation, a grooved cam element mounted on said shaft having a groove for each gear and together with said gear driven in synchronism with said coin carrying element, a register, a coin lever mounted over the face of said coin carrying element adapted to be elevated by coins carried thereon, and means shifted by said lever adapted to engage said grooved cam element to entrain said register with said mutilated gear to register a coin.

100. In a device of the class described the combination with an inclined coin carrying element and means for driving the same, of a shaft mounted at the rear of said element, driving connections between the same and said element whereby said shaft is driven in synchronism therewith, a peripherally grooved cam on said shaft, mutilated gears on said shaft lying in a different plane of rotation, a register adapted to be entrained with said gear to be driven thereby, mechanism mounted to co-act with a coin on said carrying element to shift the register into gear with the mutilated gear, and mechanism co-acting with said peripherally grooved cam to maintain the register entrained with said mutilated gear until registration of a coin has been effected.

101. In a device of the class described the combination with an inclined coin carrying element, of driving means therefor, an inclined shaft mounted adjacent to said coin carrying element and at the rear thereof, a mutilated gear and a cam element rigidly mounted on said shaft one adjacent the other, a register mounted adjacent said coin carrying element, shiftable means adapted to entrain said register with said mutilated gear, driving connections between said shaft and said coin carrying element whereby said cam and said mutilated gear are driven in synchronism with said coin carrying element, mechanism movable with said shiftable means adapted to engage said cam element to maintain said means in a shifted position, and a coin lever mounted at the edge of said coin carrying element adapted to be elevated by the edges of coins thereon to move said mechanism into engagement with said cam.

102. In a machine of the class described a fare box, a fare registering casing below the same, a fare register therein, a passenger register casing, a tubular standard, supporting the passenger register casing above the fare box, a passenger register in the passenger register casing, a rotatable shaft extending through the tubular standard for actuating the passenger register, and a mechanism in the fare register casing actuated by the coins for actuating the fare register and the passenger register shaft.

In testimony whereof I have hereunto subscribed my name in the presence of two subscribing witnesses.

JAY M. JOHNSON.

Witnesses:
CHARLES W. HILLS, Jr.,
FRANK K. HUDSON.